US008424041B2

(12) United States Patent
Candelore et al.

(10) Patent No.: US 8,424,041 B2
(45) Date of Patent: Apr. 16, 2013

(54) METHOD AND SYSTEM FOR DOWNLOADING CONTENT TO A CONTENT DOWNLOADER

(75) Inventors: Brant L. Candelore, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 915 days.

(21) Appl. No.: 11/452,846

(22) Filed: Jun. 13, 2006

(65) Prior Publication Data
US 2007/0288967 A1 Dec. 13, 2007

Related U.S. Application Data

(60) Provisional application No. 60/714,710, filed on Sep. 7, 2005, provisional application No. 60/714,940, filed on Sep. 7, 2005.

(51) Int. Cl.
*H04N 5/445* (2011.01)
(52) U.S. Cl.
USPC ............ 725/50; 725/132; 725/133; 725/140; 725/152
(58) Field of Classification Search .................... 725/50, 725/132, 140, 152, 133
See application file for complete search history.

(56) References Cited

U.S. PATENT DOCUMENTS

| 5,003,591 A | 3/1991 | Kauffman et al. |
| 5,524,195 A * | 6/1996 | Clanton et al. ............... 725/61 |
| 5,635,980 A | 6/1997 | Lin et al. |
| 5,657,049 A * | 8/1997 | Ludolph et al. ............... 715/856 |
| 5,767,893 A | 6/1998 | Chen et al. |
| 5,974,454 A | 10/1999 | Apfel et al. |
| 6,141,002 A * | 10/2000 | Kanungo et al. ............... 715/716 |
| 6,253,061 B1 | 6/2001 | Helferich |
| 6,286,104 B1 | 9/2001 | Buhle et al. |
| 6,335,736 B1 * | 1/2002 | Wagner et al. ............... 715/716 |
| 6,442,328 B1 * | 8/2002 | Elliott et al. ............... 386/46 |
| 6,600,496 B1 | 7/2003 | Wagner et al. |
| 6,698,023 B2 | 2/2004 | Levitan |
| 6,760,918 B2 | 7/2004 | Rodriguez et al. |
| 6,775,830 B1 | 8/2004 | Matsunami et al. |

(Continued)

OTHER PUBLICATIONS

Brant Candelore, Leo Pedlow, "Method and System for Downloading Content to a Target Device" related U.S. Appl. No. 11/452,868, final office action dated Oct. 24, 2012.

*Primary Examiner* — Pankaj Kumar
*Assistant Examiner* — Sahar Baig
(74) *Attorney, Agent, or Firm* — John L. Rogitz

(57) ABSTRACT

A content downloader system including a display for displaying a user interface enabling a user to select content to be downloaded and initiate downloading; a set-top-box coupled to the display for providing the user interface and for receiving an indication of the content to be downloaded; and a content downloader coupled to and separate from the set-top-box, the content downloader for receiving the content. The content downloader has at least one memory component for storing content, at least one input/output connection for communicating to electronic devices, optionally including a removable memory card and optionally including an encryption/decryption unit. The content downloader may have an identification whereby its identity is authenticated by the content provider. The content downloader downloads the content selected by the user after successful authentication whereby the selection is made using the display and the set-top-box, and the content downloaded to the content downloader separate than the set-top-box.

30 Claims, 30 Drawing Sheets

U.S. PATENT DOCUMENTS

| | | | |
|---|---|---|---|
| 6,806,889 B1 | 10/2004 | Malaure et al. | |
| 6,810,413 B1 | 10/2004 | Rajakarunanayake et al. | |
| 6,836,793 B1 | 12/2004 | Cesar et al. | |
| 6,871,323 B2 | 3/2005 | Wagner et al. | |
| 6,904,264 B1 | 6/2005 | Frantz | |
| 6,929,549 B1 | 8/2005 | Yamada | |
| 6,931,381 B1* | 8/2005 | Petit | 705/53 |
| 6,986,135 B2 | 1/2006 | Leathers et al. | |
| 7,096,293 B2 | 8/2006 | Lee | |
| 7,249,354 B2 | 7/2007 | Tigani et al. | |
| 7,254,622 B2 | 8/2007 | Nomura et al. | |
| 7,290,258 B2 | 10/2007 | Steeb et al. | |
| 7,340,677 B2 | 3/2008 | Cowperthwaite | |
| 7,366,589 B2 | 4/2008 | Habermas | |
| 7,370,114 B1 | 5/2008 | Philyaw et al. | |
| 7,430,610 B2 | 9/2008 | Pace et al. | |
| 7,430,736 B2 | 9/2008 | Nguyen et al. | |
| 7,480,907 B1 | 1/2009 | Marolia et al. | |
| 7,500,235 B2 | 3/2009 | Maynard et al. | |
| 7,600,015 B2* | 10/2009 | Cugi | 709/224 |
| 7,624,417 B2* | 11/2009 | Dua | 725/114 |
| 7,627,868 B2 | 12/2009 | Addington et al. | |
| 7,673,297 B1 | 3/2010 | Arsenault et al. | |
| 2001/0030959 A1 | 10/2001 | Ozawa et al. | |
| 2001/0055465 A1* | 12/2001 | Inoue | 386/46 |
| 2002/0040475 A1* | 4/2002 | Yap et al. | 725/39 |
| 2002/0156877 A1 | 10/2002 | Lu et al. | |
| 2002/0174433 A1* | 11/2002 | Baumgartner et al. | 725/58 |
| 2003/0005427 A1 | 1/2003 | Herrero | |
| 2003/0046676 A1 | 3/2003 | Cheng et al. | |
| 2003/0233646 A1 | 12/2003 | Cohen et al. | |
| 2004/0010685 A1 | 1/2004 | Sakaguchi et al. | |
| 2004/0044999 A1 | 3/2004 | Gibson | |
| 2004/0068721 A1 | 4/2004 | O'Neill et al. | |
| 2004/0117635 A1* | 6/2004 | Karaoguz et al. | 713/182 |
| 2004/0122949 A1 | 6/2004 | Zmudzinski et al. | |
| 2004/0148525 A1 | 7/2004 | Aida et al. | |
| 2004/0181593 A1 | 9/2004 | Kanojia et al. | |
| 2004/0255326 A1* | 12/2004 | Hicks, III et al. | 725/81 |
| 2004/0268386 A1* | 12/2004 | Logan et al. | 725/34 |
| 2005/0010963 A1 | 1/2005 | Zeng et al. | |
| 2005/0028208 A1* | 2/2005 | Ellis et al. | 725/58 |
| 2005/0081186 A1 | 4/2005 | Tigani et al. | |
| 2006/0020938 A1 | 1/2006 | Elcock et al. | |
| 2006/0059480 A1 | 3/2006 | Kimoto | |
| 2006/0143572 A1 | 6/2006 | Scott et al. | |
| 2006/0179079 A1 | 8/2006 | Kolehmainen | |
| 2006/0180649 A1 | 8/2006 | Casey | |
| 2006/0248522 A1 | 11/2006 | Lakshminarayanan et al. | |
| 2006/0294512 A1 | 12/2006 | Seiden | |
| 2007/0067801 A1* | 3/2007 | Monta et al. | 725/44 |
| 2007/0089110 A1 | 4/2007 | Li | |
| 2007/0104456 A1* | 5/2007 | Craner | 386/83 |
| 2007/0242659 A1 | 10/2007 | Cantu et al. | |
| 2008/0126803 A1 | 5/2008 | Ginter et al. | |
| 2008/0263607 A1 | 10/2008 | Gurevich et al. | |

* cited by examiner

| Kill Bill: Vol. 1 |
| Uma Thurman, David Carradine, (2003), ***, Wuentin Trantino's delirious, highly ..... |

| Kill Bill: Vol. 1 |
| Cheaper by the Dozen |
| Miracle |
| Spy Kids 3: Game Over |
| Stealing Candy |
| Timeline |

FIGURE 5

METHOD AND SYSTEM FOR DOWNLOADING CONTENT TO A CONTENT DOWNLOADER

This application claims the benefit of a provisional application Ser. No. 60/714,710, inventor Candelore et al., titled "ENABLING CONTENT DOWNLOADS USING CABLE VOD SYSTEM AND STANDARD WEB BASED FULFILLMENT" and a provisional application Ser. No. 60/714,940, inventors Candelore et al., titled "DOCSIS CONTENT DOWNLOADER" that were filed on Sep. 7, 2005. The above-cited provisional applications are incorporated herein in their entirety.

BACKGROUND

1. Technical Field

The present invention relates to the field of multi-media content. More particularly, embodiments of the present invention relate to a method and system for downloading multi-media content to a content downloader.

2. Background Art

Over the past few years, increase in bandwidth efficiency and reduction in download time has increased the use of multi-media content. For example, the use of multi-media content (e.g., video and music) has become prevalent through use of electronic devices such as cellular phones, PCs, IPods and set-top-boxes to name a few.

Using a personal computer (PC), IPod, cellular phone or other similar electronic devices for downloading multi-media content in general require a web based system, enabling the user to navigate screens in order to find and select the desired multi-media content for download. For example, FIG. 1 shows a PC in communication with a server for downloading content. Downloaded content may be later transferred to other electronic devices (e.g., IPod, memory stick, Play Station Portable (PSP)). Using a web based system for a PC, cellular phone or IPod has not been adapted universally because it can be complicated.

Downloading multi-media content to a PC and from the PC to other electronic devices (e.g., an IPod) makes the process slower because it requires that the content be transferred to a PC and from the PC to another electronic (e.g., an IPod). For example, FIG. 1 shows a PC downloading content from a server and then transferring the downloaded content to an IPod, PSP and a memory stick. This process necessarily requires an extra step of transferring content from the downloading device to another electronic device after completion of content download.

Furthermore, downloading multi-media content to a downloading device that is running other applications slows the processing speed for applications running on the downloading device. For example, if a download is in progress while the user is playing games, watching video, or listening to music, the processing speed of the application is reduced considerably. As such, the current technology for downloading multi-media content has not only proven difficult for some users while requiring a transfer of content from a PC to other electronic devices after completing the download, but it also reduces the processing speed of other applications that are running on the downloading device.

Other electronic devices such as set-top-boxes have been used to download content while avoiding using PC and a web based system all together. For example, video on demand (VOD) has been used by subscribers to order movies through their cable provider. FIG. 2 shows one example for using a set-top-box to download content. In FIG. 2, the set-top-box provides a user interface to the subscriber through a display (e.g., a television set). The subscriber then navigates the user interface (e.g., a menu) to select and download a desired content, thereby initiating the download. The set-top-box communicates with the content provider (headend) to initiate the download and receives the content. The use of set-top-box for initiating and receiving content, however, has its own restrictions. For example, once content (e.g., a movie) has been ordered and played, it is not saved. Moreover, the content from a set-top-box cannot be used by other electronic devices nor can it be transferred and used elsewhere.

SUMMARY

Accordingly, there is a need to provide a television-centric experience for content acquisition by eliminating a web based system in order to ease the process for downloading content. Additionally there is a desire to eliminate the need to transfer content from one electronic device (e.g., a PC) to another electronic device (e.g., an IPod). Moreover, there is a need to free up processing power while the download is in progress, such that a user can continue with other applications (e.g., playing games, watching videos, or listening to music) without impacting their processing speed. It will become apparent to those skilled in the art after reading the detailed description of the present invention that the embodiments of the present invention satisfy the above mentioned needs.

In one embodiment of the present invention a content downloader is used to download the content selected by the user. In one embodiment of the present invention, the content downloader is coupled to a set-top-box and to a content provider (e.g., a cable provider). The set-top-box provides a user interface through which a user can navigate windows and menus of a graphical user interface in order to find and select a downloadable content. Once the content has been selected, the download is initiated and the content provider downloads the content to the content downloader. The content downloader may include a status indicator for indicating the status of the download (e.g., complete, in progress, or error). The content downloader further includes at least one memory component for storing the content and an input/output connection operable to communicate with the content provider. The content downloader may optionally include a removable memory card, a wireless device for sending and receiving content, additional connections for connecting to other electronic devices, and an encryption/decryption unit for decrypting encrypted content and encrypting content prior to transferring content to other electronic devices. Moreover, the content downloader may have a corresponding identification such that it can be authenticated by the content provider before initiating the download.

As a result of employing the embodiments of the present invention the process for downloading content is improved. The embodiments of the present invention provide a television-centric experience to the user by providing a user interface through a set-top-box. Moreover, the embodiments of the present invention eliminate the need to transfer content from one electronic device to another after completing the content download. Additionally, the embodiments of the present invention free up processing power during content download, thereby enabling the user to continue using other applications (e.g., watching a movie, listening to music, or playing games) without impacting the processing speed of those applications.

More specifically, an embodiment of the present invention pertains to a content downloader system, the content downloader system includes a display for displaying a user interface enabling a user to select content to be downloaded and initiate downloading; a set-top-box coupled to the display for providing the user interface and for receiving an indication of the content to be downloaded; and a content downloader coupled to and separate from the set-top-box, the content downloader for receiving and storing the content.

Embodiments include the above and wherein the content downloader system is further coupled to a content provider wherein the content provider in response to the user command uploads the content to the content downloader. Embodiments further include the above and wherein the content downloader further includes a status indicator; at least one memory component; and an input/output connection operable to communicate with a content provider and coupled to the set-top-box. Moreover, the embodiments include the above and wherein the content downloader includes at least one removable memory card.

Embodiments further include the above and wherein the content downloader further includes a wireless device for sending and receiving the content. Embodiments also include the above and wherein the content downloader includes additional connections capable of communicatively coupling the content downloader to other electronic devices. Moreover, embodiments further include the above and wherein the content downloader includes an encryption/decryption unit to decrypt encrypted content downloaded and to encrypt downloaded content before transferring the downloaded content to other electronic devices. Additionally, embodiments include the above and wherein the content downloader has an identification that is registered with a content provider and wherein the identity of the content downloader is authenticated by the content provider before the content provider begins uploading the content to the content downloader.

An embodiment of the present invention further pertains to a method for downloading content in an electronic system, the method includes generating a user interface using a set-top-box device wherein the user interface is operable to allow user selection of a selected content; displaying a portion of the user interface wherein the user interface comprises a plurality of selectable content items; in response to a user selection of the selected content, initiating a download operation wherein the selected content is delivered from a content provider to a device; and storing the selected content into the device wherein the device is separate from said set-top-box.

Embodiments include the above and wherein initiating the download further includes receiving an identification of the device; authenticating the device; and uploading the selected content to the device wherein the selected content is delivered from the content provider to the device if the device is successfully authenticated. Embodiments further include the above and wherein authentication is performed by comparing the identification of the device to previously registered devices stored in the content provider. Embodiments also include the above and wherein initiating the download further includes examining the device to determine whether sufficient memory to store the content exists; and indicating a status of the device by outputting a signal. Additionally, embodiments further include the above and wherein initiating the download further includes creating at least one folder in the device for storing the content to a memory. Moreover, embodiments further include the above and wherein the content is encrypted before uploading from the content provider and decrypted after downloading the content to the device. Embodiments also include the above and wherein the content is encrypted after the content is downloaded by the device and before the content is sent to another electronic device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 shows one embodiment of a user interface for selecting content.

DETAILED DESCRIPTION

Figure 1:
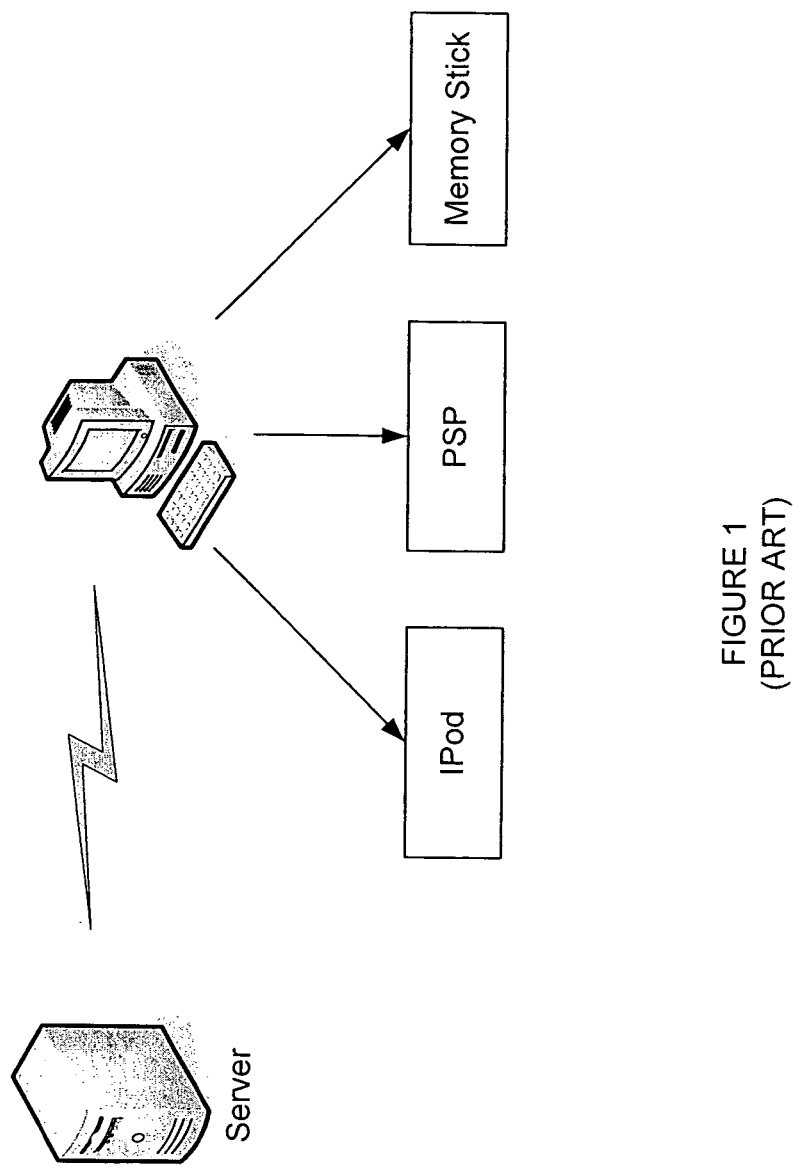
FIG. 1 shows a prior art system for downloading content using a PC.
Figure 2:
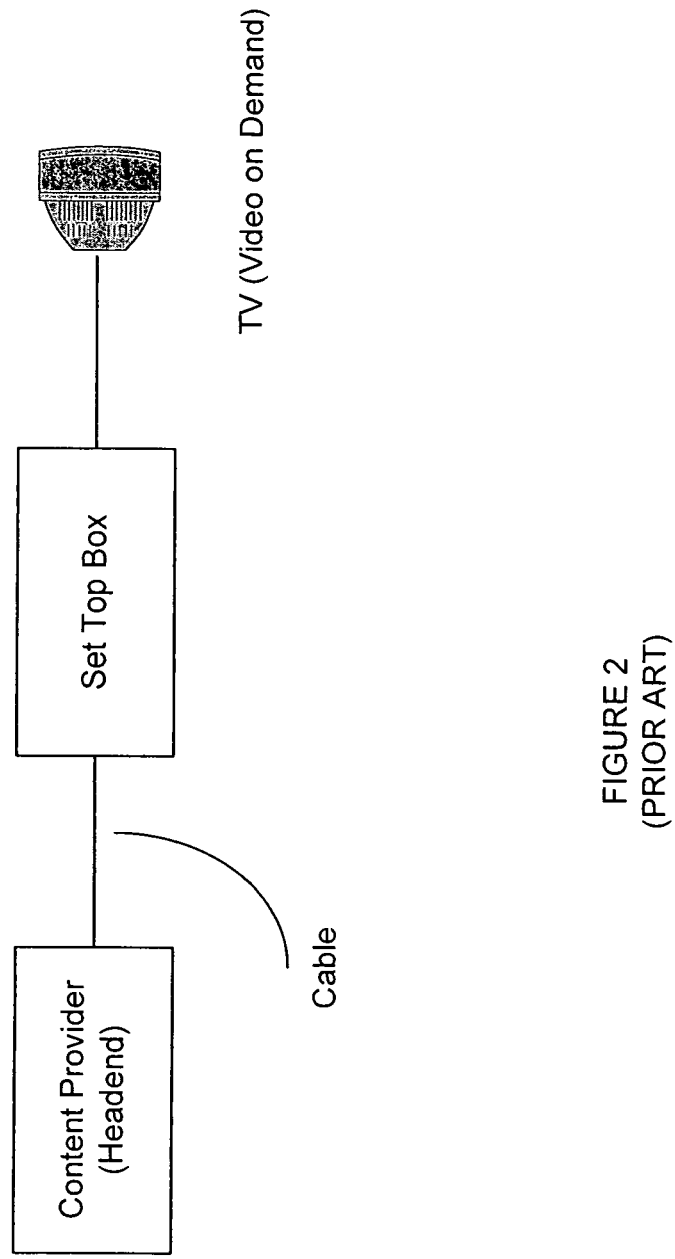
FIG. 2 shows a prior art system for downloading content to a set-top-box.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Downloading Content to a Content Downloader

Downloading content to a content downloader, a standalone downloader, is described first. Downloading content to a selected target device is next described.

Figure 3:
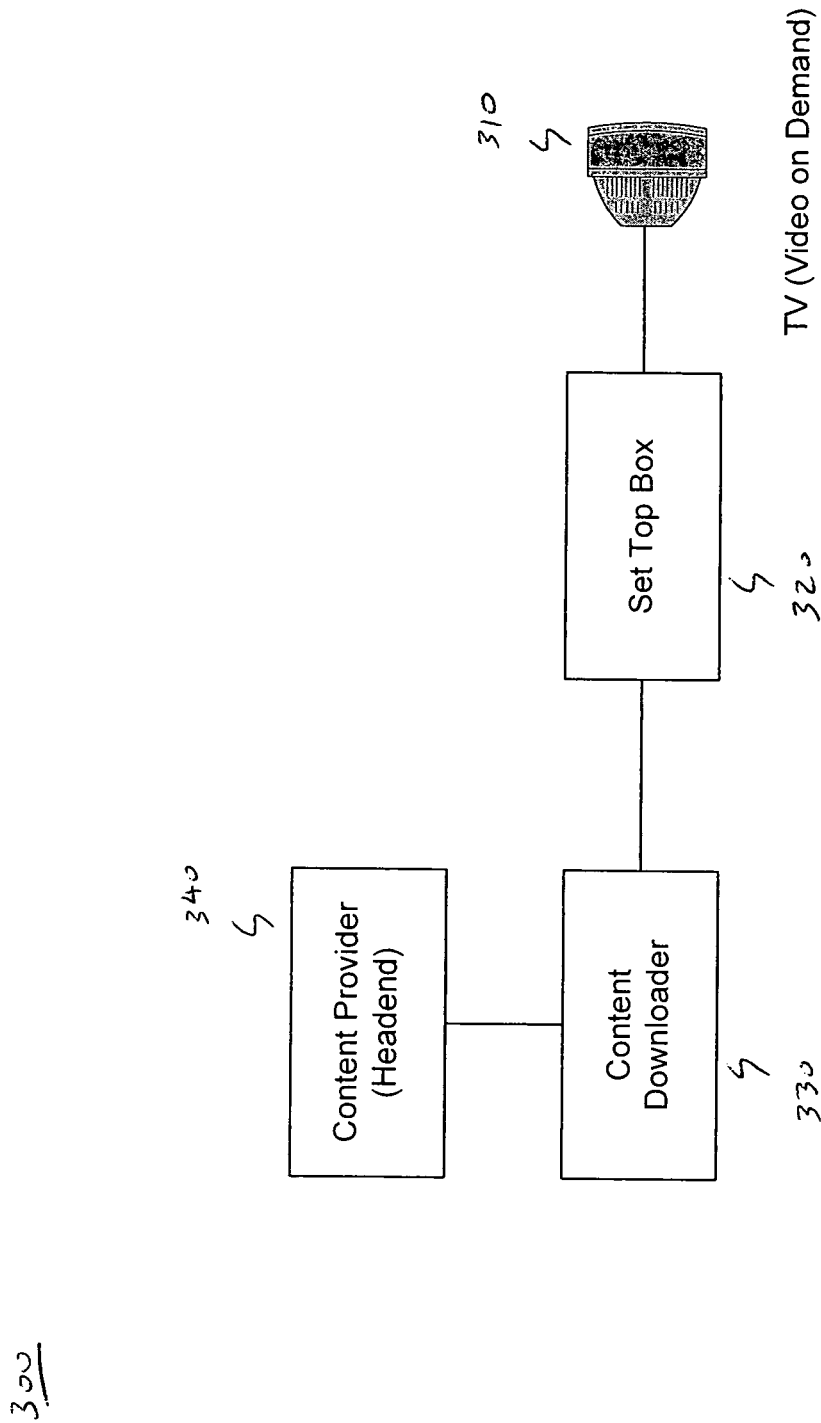
FIG. 3 shows an exemplary system embodiment of the present invention for downloading content to a content downloader.

Referring now to FIG. 3, one system embodiment of the present invention for downloading content is shown. In this embodiment of the present invention, a display 310 (e.g., a television) for displaying a user interface may be coupled to a set-top-box 320. The user interface enables a user to find and select content for downloading. In one embodiment, the user interface is provided by functionality of the set-top-box 320. As such, the set-top-box 320 generates the user interface, receives an indication that content is selected and is ready to be downloaded. The set-top-box 320 is further coupled to a content downloader 330 which receives the content from a content provider 340 (e.g., a cable service provider). The content provider 340 provides the content in response to the user command initiated at the set-top-box 320.

System 300 provides a two way cable receiver to receive portable media content from a content provider 340 (e.g., a cable service provider) in a television-centric experience. System 300 eliminates the need to transfer the downloaded content from one electronic device to another. Moreover, the embodiments of the present invention free the processor of download initiating device from downloading content since the content is being downloaded to a device other than the initiating device. Consequently, during the download period the user may continue with other applications (e.g., playing games, watching videos, or listening to music) without any impact on the processing speed of the application being run by the processor of the download initiating device. In one embodiment of the present invention a subscriber uses the user interface provided by the set-top-box 320 as displayed through a display, such as a television set 310 to navigate a selectable menu in order to find a desired content to download. When content is selected, the content provider 340 (e.g., a cable service provider) is contacted and download of the content to the content downloader 330 is initiated.

Figure 4:
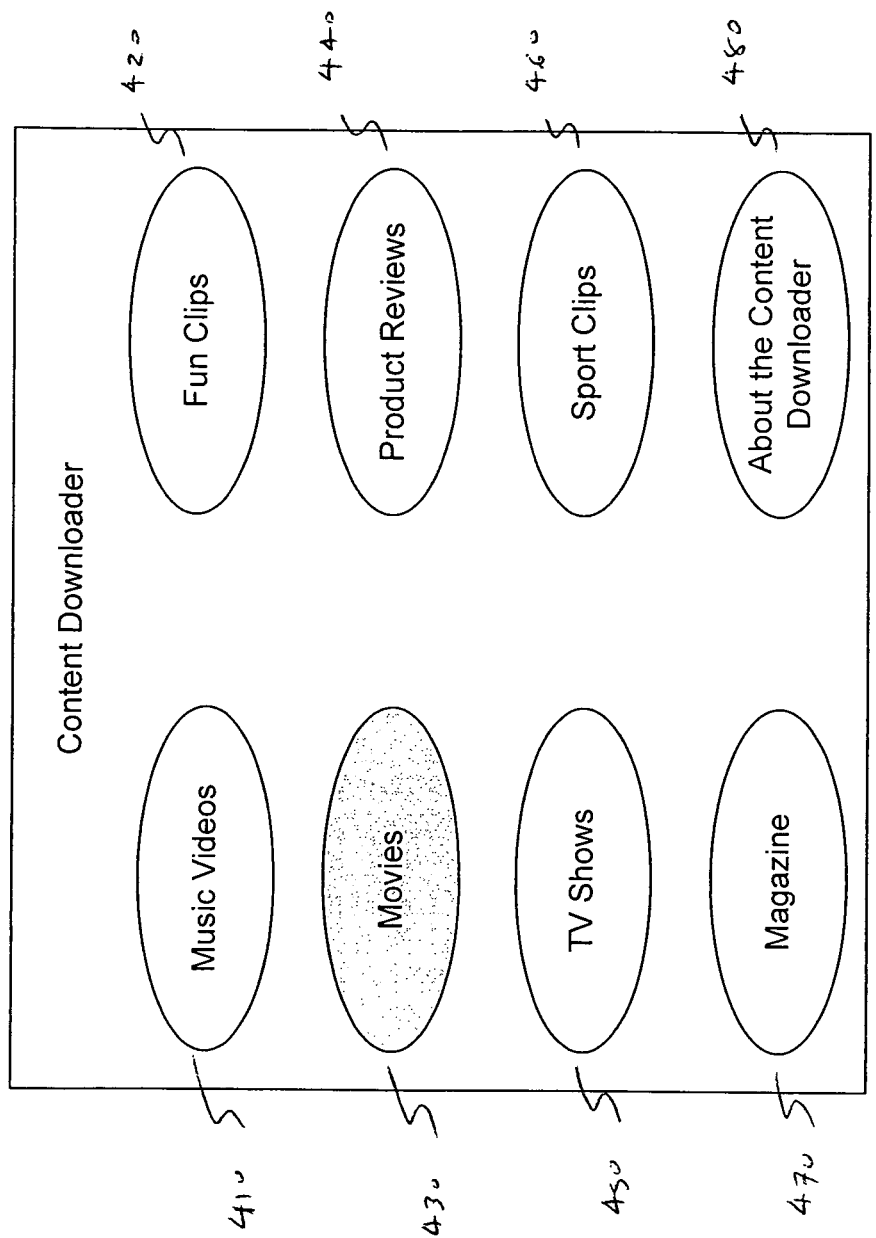
FIG. 4 shows an exemplary user interface for selecting a type of content for download in accordance with one embodiment of the present invention.

For example, a subscriber may wish to watch a movie on a flight to New York. Referring now to FIG. 4, an exemplary user interface is provided by the set-top-box 320 and displayed to the subscriber using the display 310. It is appreciated that the user interface may be a graphical user interface. In this example, the subscriber is provided with a selectable menu for different content to download. For example, the subscriber may be given an option, through a selectable tabs to download music videos 410, fun clips 420, movies 430, product reviews 440, TV shows 450, sport clips 460, magazine 470 or to read about the content downloader 480 to name a few. In this example, the subscriber uses the interface and selects the on-screen Movies 430 tab. It is appreciated that the use of a tab is by way of example and not limitation. As such, it is appreciated that selectable means other than a tab may be employed in order to select an appropriate action. For example, a selectable option may be through a drop down menu, a pop-up window or a link.

Referring now to FIG. 5, a list of movies available for download to a content downloader is presented on-screen to the subscriber. In this example, available movies are Kill Bill Vol. 1, Cheaper by the Dozen, Miracle, Spy Kids 3: Game Over, Stealing Candy and Timeline. It is appreciated that various information regarding downloadable content for instance may be displayed to the subscriber. For example, a short summary, the year and leading actors for example may be displayed to assist the subscriber in selecting a downloadable content. In this example, Cheaper by the Dozen has been selected by the subscriber.

Figure 6:
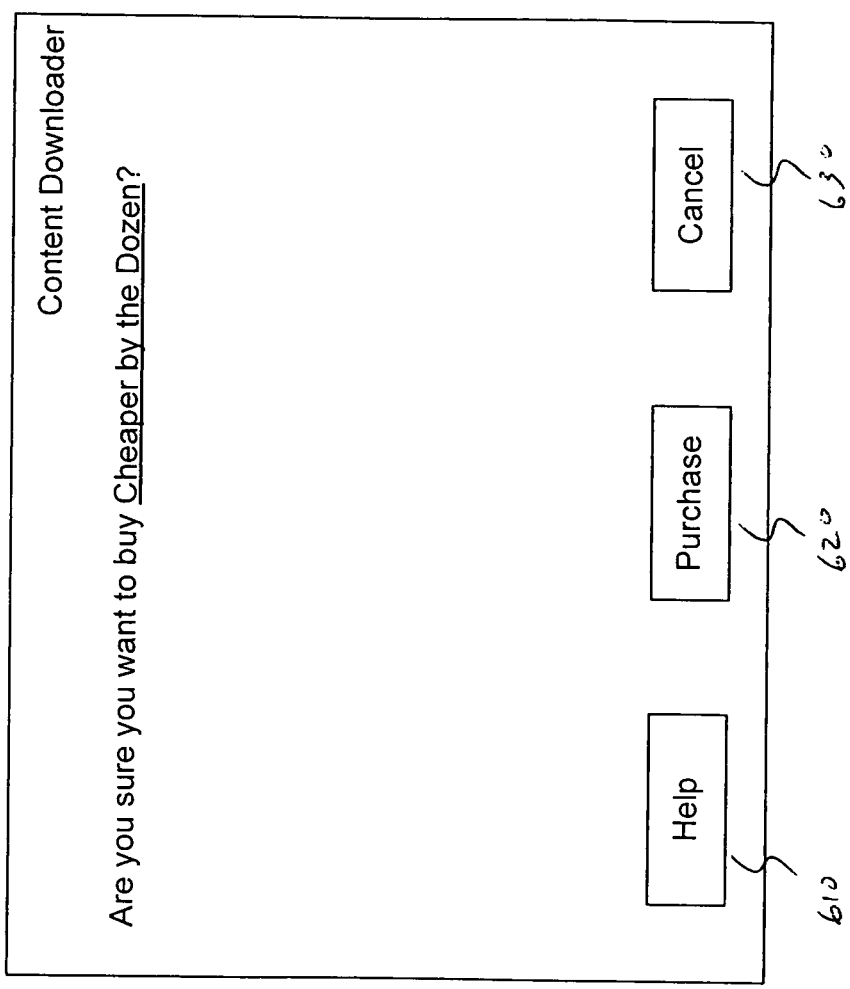
FIG. 6 shows one embodiment of a user interface for confirming the download for selected content.

It is appreciated that a confirmation of a content selected may be desirable in order to ensure that a selected content for download is not by mistake. Referring now to FIG. 6, the subscriber is asked to confirm the selection of the content for download. In this example, the subscriber is asked whether the subscriber wishes to purchase and download Cheaper by the Dozen. Other selectable tabs may provide the subscriber with additional options. In this example, selectable tabs are help 610, purchase 620 or cancel 630. Accordingly, the subscriber may confirm the selection of the content (e.g., Cheaper by the Dozen) by selecting the purchase 620 tab. Alternatively, the subscriber may select a help 610 tab for additional help or select a cancel 630 tab for canceling the download of the selected content (e.g., Cheaper by the Dozen). It is appreciated that even though three selectable options are provided, other options may be added or deleted as needed for a particular application. It is appreciated that the use of an on-screen tab is by way of example and not limitation. It is further appreciated that selectable means other than a tab may be employed in order to select an appropriate action. For example, a selectable option may be through a drop down menu, a pop-up window or a link.

In one embodiment of the present invention, the content downloader 330 may be associated with the subscriber's account. In this example, the content downloader 330 is tied to the subscriber's account and pre-registered with the content provider 340 (e.g., cable service provider). Prior to downloading the selected content, the content provider 340 may determine whether the subscriber is in good standing. For example, the content provider 340 may determine whether the subscriber has paid for the selected content or whether the subscriber has been approved for purchasing the selected content. Steps performed by the content provider 340 are later described.

The content provider 340 may also interrogate the content downloader 330 in order to determine whether the content downloader 330 has sufficient memory to download the selected content. The content provider 340 may send an on-screen-status-display to the set-top-box 320 stating whether sufficient memory exists.

Figure 7:
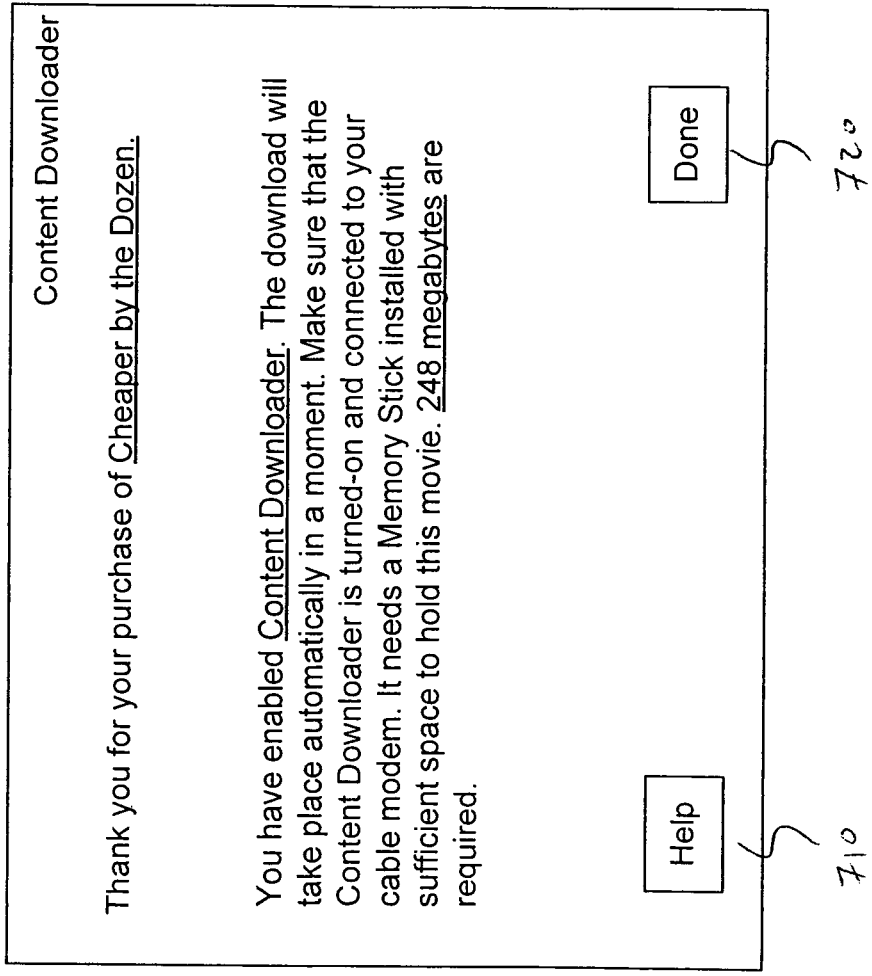
FIG. 7 shows one embodiment of a user interface for providing information prior to download.

Alternatively, the content provider 340 may send an on-screen-display to the set-top-box 320 indicating how much memory is needed for downloading the selected content. Referring now to FIG. 7, an exemplary on-screen-display to the set-top-box 320 is shown. In this example, the subscriber is thanked for purchasing a downloadable content (e.g., Cheaper by the Dozen). Moreover, a message is displayed notifying the subscriber that a content downloader 330 is enabled and that sufficient memory is required. In this example, the movie selected requires 248 megabytes of free space. The subscriber may be provided with further options. For example, a help 710 tab and a done 720 tab may provide the subscriber with additional options. Accordingly, the subscriber may confirm that the content downloader 330 has sufficient memory to store the selected content by selecting the done 720 tab. Alternatively, the subscriber may request help by selecting the help 710 tab. It is appreciated that even though two selectable tabs are provided in this example, other tabs may be added or deleted as needed for a particular application. It is appreciated that the use of a tab is by way of example and not limitation. It is further appreciated that selectable means other than a tab may be employed in order to select an appropriate action. For example, a selectable option may be through a drop down menu, a pop-up window or a link.

Once the content is selected and the download is initiated, the set-top-box 320 can act normally. In other words, once download is in progress the subscriber may continue surfing other channels, continue listening to music or continue playing games. Therefore, the processing speed of applications running by the processor is not affected by the download.

Figure 8:
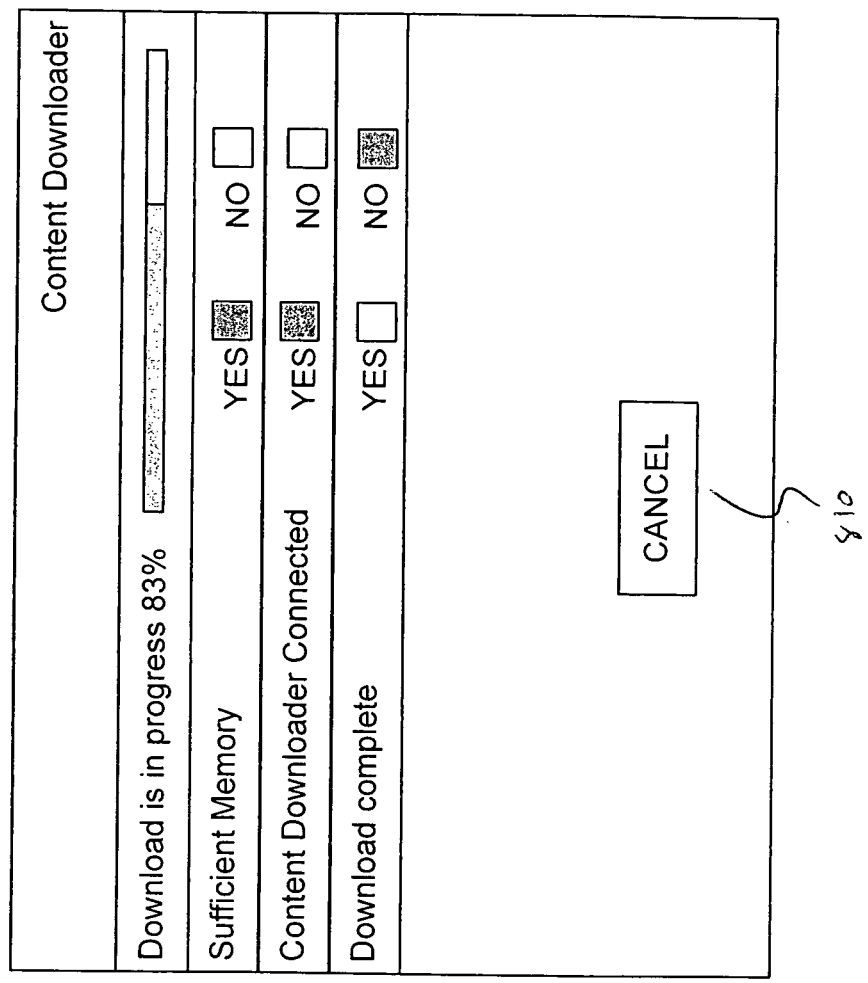
FIG. 8 shows one embodiment for indicating the download status of a content downloader.

Moreover, the download status may be indicated using a status indicator. Referring now to FIG. 8 a download status is displayed to the subscriber. For example, the subscriber may be provided with a set of information regarding the downloadable content such as whether the download is in progress and if so how much of the content is downloaded. In this example, the download is in progress and 83% of the download is completed. Moreover, the status indicator may provide additional information such as whether sufficient memory exists, whether content downloader is connected and whether the download has been completed. It is appreciated that other information may be similarly implemented and displayed to the subscriber. The subscriber is also provided with an option to cancel the download at any time by selecting the cancel 810 tab.

It is appreciated that other means may be employed to indicate the status. As such, the status may be indicated by sounding an alarm, or by using light emitting devices (LED). For example, flashing a red light rapidly may indicate that the content downloader 330 does not have sufficient memory to download the content. A solid red light may indicate that a download is in progress and flashing a green light may indicate that download has been completed.

In the preferred embodiment of the present invention, the content may be stored on a removable memory device (e.g., a flash memory). Accordingly, when the content is downloaded to the removable memory (e.g., a flash memory), the subscriber may simply remove the memory card and carry it to watch the movie on the flight to New York.

It is appreciated that using a content downloader 330 as described eliminates the need to transfer the content from one electronic device to another after completion of the download e.g., as done with a PC as the receiver device. Moreover, it is now apparent that using the content downloader 330 provides a television-centric experience to the subscriber. Additionally, it is now clear that once the download is initiated by the initiating device (e.g., a set-top-box), the initiating device (e.g., a set-top-box) can return to previously running applications (e.g., listening to music, watching a video, playing games). Accordingly, the processing speed of the application running by the initiating device (e.g., a set-top-box) is not affected by the download because the download is to a device other than the initiating device. For example, the download is to the content downloader 330 separate than the set-top-box that initiated the download. As such, the subscriber may continue with previously running applications (e.g., listening to music, watching a video, playing games) on the initiating device (e.g., a set-top-box) without any impact on the processing speed of the applications being run by the set-top-box. Moreover, it is now apparent that content selection is performed at the set-top-box 320 and the selected content is downloaded to a content downloader 330 separate than the set-top-box 320.

Figure 9:
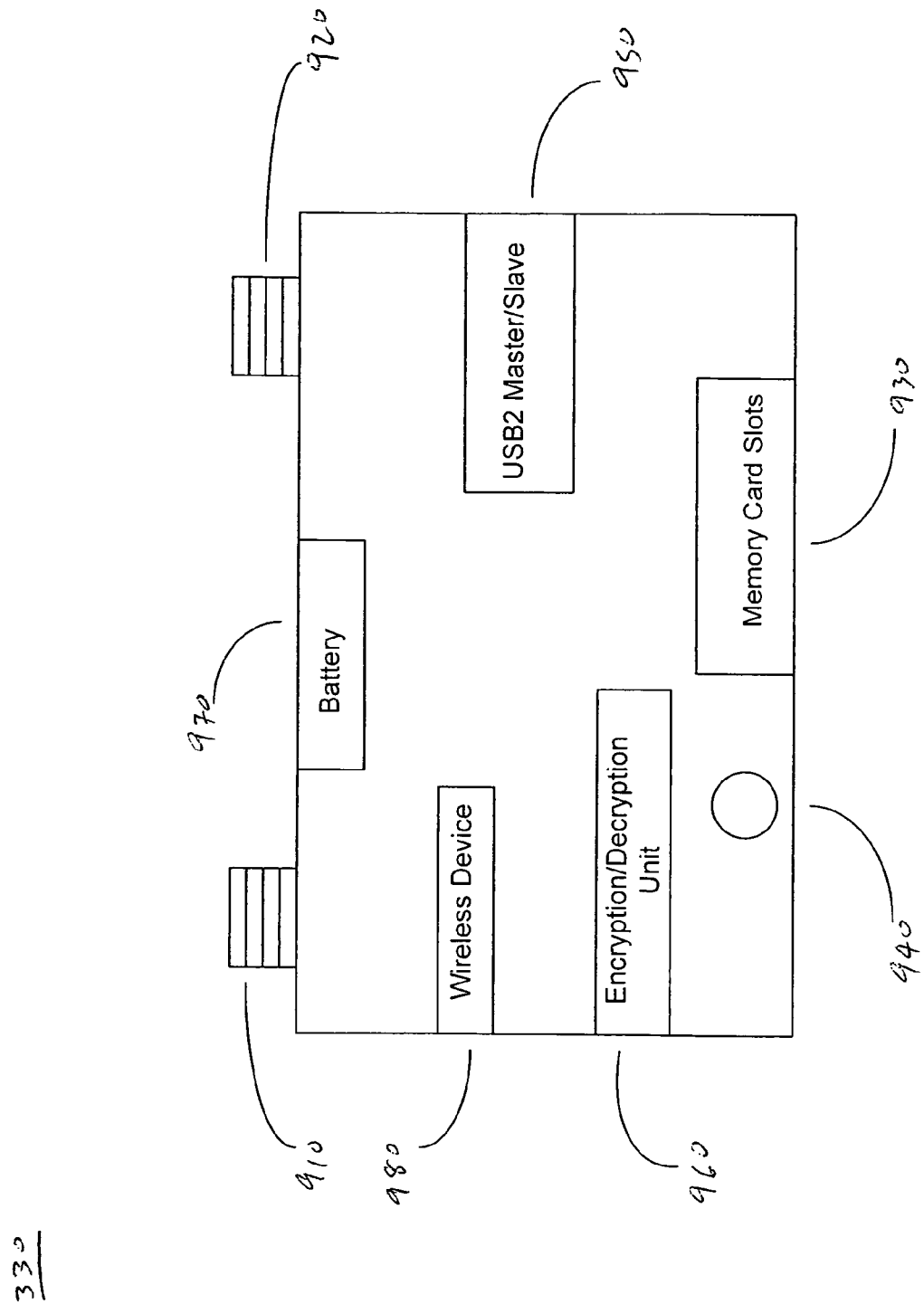
FIG. 9 shows one embodiment of the present invention for downloading content to a content downloader.

Referring now to FIG. 9, one embodiment of a content downloader is shown. In this embodiment, the content downloader 330 comprises an input/output 910 connection which is in communication with the content provider 340 or other electronic devices. In the preferred embodiment of the present invention, the input/output 910 is a coax input/output. Optionally, an input/output connection 920 may be used to communicate with the set-top-box 320.

Referring still to FIG. 9, memory card slots 930 may hold at least one memory card for storing content download. Memory cards may be removable memory. The content downloader 330 further comprises a status indicator 940. As described above, the status indicator 940 may be a display or a unit sending a message to the set-top-box 320 indicating the status of the download. In this embodiment, the status indicator 940 may be an LED device, flashing a red light rapidly for instance indicating that the content downloader 330 has insufficient memory to download the content; a solid red light indicating that a download is in progress; and flashing a green light indicating that the content download has been completed. It is appreciated that in other embodiments the status indicator may be a speaker for outputting an audio signal as its status indicator.

The content downloader 330 may further include additional input/output connections for connecting to additional electronic devices. In the preferred embodiment of the present invention the additional input/output connection is a USB2 master/slave 950. It is appreciated that other forms of connections may be used.

Referring still to FIG. 9, the content downloader 330 may include an encryption/decryption unit 960. The encryption/decryption unit 960 is for providing secure access to content and prevent unauthorized users from accessing the content. For example, the desired content may be encrypted prior to download to make the content inaccessible to hackers and interceptors. In the preferred embodiment of the present invention the content is protected by a digital rights management (DRM). As such, Marlin codes are used for protecting content. Therefore, during download, the content is encrypted by the content provider 340 and the encrypted content received by the content downloader 330 is decrypted in order to make the downloaded content accessible. Similarly, to prevent unauthorized access, the received content may be encrypted before transferring the content to other electronic devices through input/output connection 950 or other connections.

The content downloader 330 includes a wireless device 980 for allowing communication between the content downloader 330 and other wireless devices. Content downloader 330 may optionally include a battery to enable it to operate without a need to connect to a power supply, thereby providing a greater mobility and flexibility.

Figure 10:
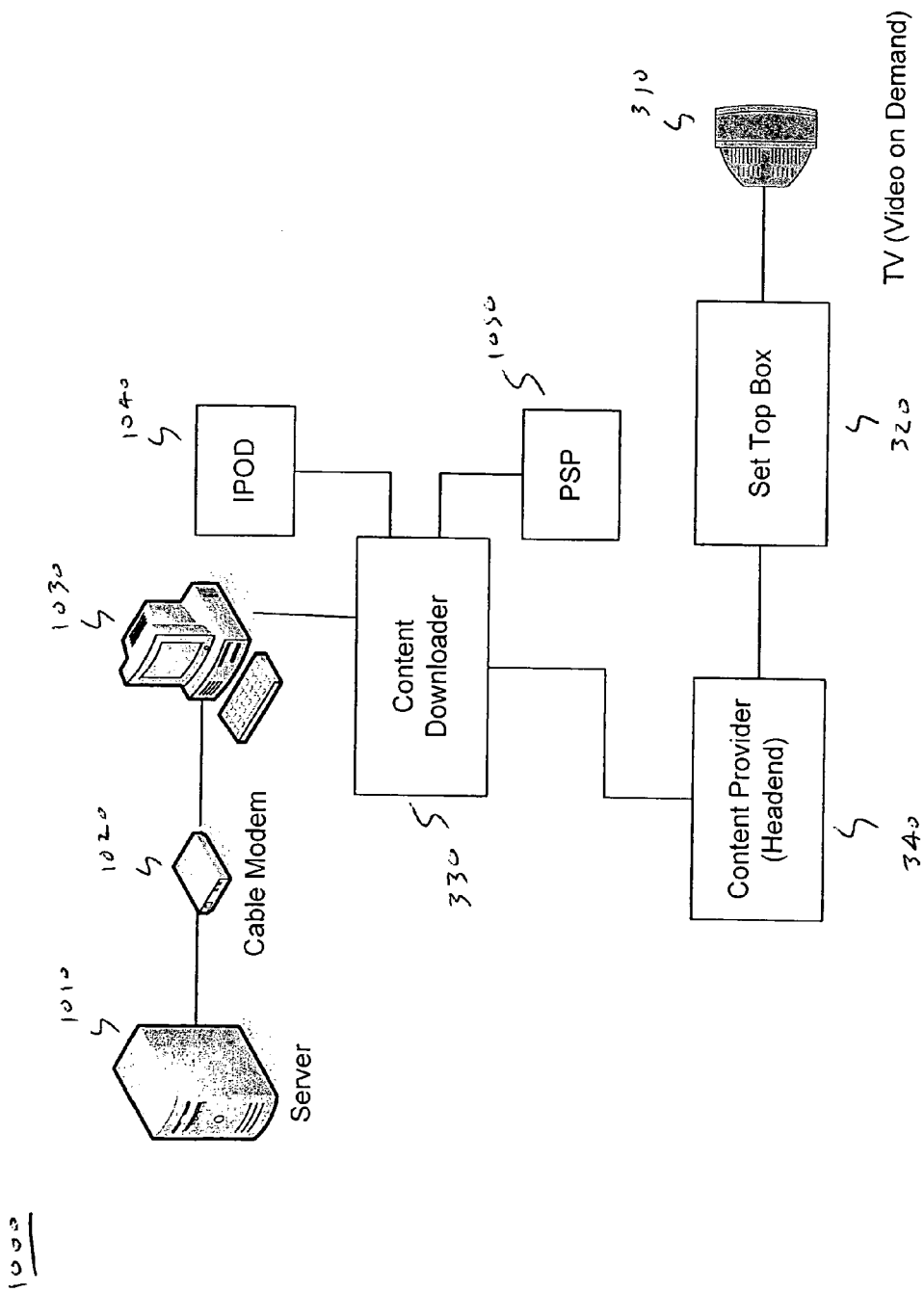
FIG. 10 shows one system embodiment of the present invention for downloading content to a content downloader.

Referring now to FIG. 10, one system embodiment of the present invention for downloading content to a content downloader is shown. In this embodiment, the subscriber uses the user interface provided by the set-top-box 320 as displayed by the display, such as a television set 310, to navigate a selectable menu to find and select a downloadable content. When a content is selected, the content provider 340 (e.g., a cable service provider) is contacted. Accordingly, the download to the content downloader 330 is initiated.

In the preferred embodiment of the present invention, the content downloader 330, in addition to having a removable memory that may be used to play content on other electronic devices, is also coupled to other electronic devices such as an IPod 1040 and play station portable (PSP) 1050. Coupling, the content downloader 330 to other electronic devices enables the content to be transferred to other electronic devices or alternatively be played by other electronic devices without transferring the downloaded content. For example, IPod 1040 may be coupled to the content downloader 330 and play a music file that was downloaded without physically transferring the file from the content downloader 330 to the IPod 1050. Alternatively, downloaded content may be transferred to the IPod 1040. By transferring the files, the electronic device (e.g., IPod 1040) can play the transferred files without having to connect to the content downloader 330. Alternatively, the memory may be removed from the content downloader 330 and placed in other electronic devices in order to use the downloaded content. Therefore, using the removable memory eliminates the need to electronically transfer content after completion of content download.

Referring still to FIG. 10, the content downloader 330 may be coupled to other electronic devices (e.g., PC 1030). By coupling the content downloader 330 to the PC 1030, the content downloader 330 can communicate with the PC 1030 and in response to the communication either transfer files between the two devices or simply enable the PC 1030 to use the downloaded content. The PC 1030 can be further coupled to a server 1010 via a cable modem 1020. It is appreciated that other means to connect to the server 1010 may be employed (e.g., wireless router). Coupling the PC 1030 to the server 1010 allows the content stored by the content downloader 330 to become accessible to other users that are connected to the server 1010. As a result, content may be shared between different electronic devices and different users. Moreover, coupling the content downloader 330 to the server enables the subscriber to upload content such as personal pictures to the server 1010.

It is appreciated that the content may be limited to subscribers in good standing. Therefore, a proper encryption may be used to limit the use of the content to those subscribers in good standing or those subscribers that have purchased the content. For example, the content can be protected by a Digital Rights Management (DRM) scheme (e.g., Marlin encrypted).

Figure 11:
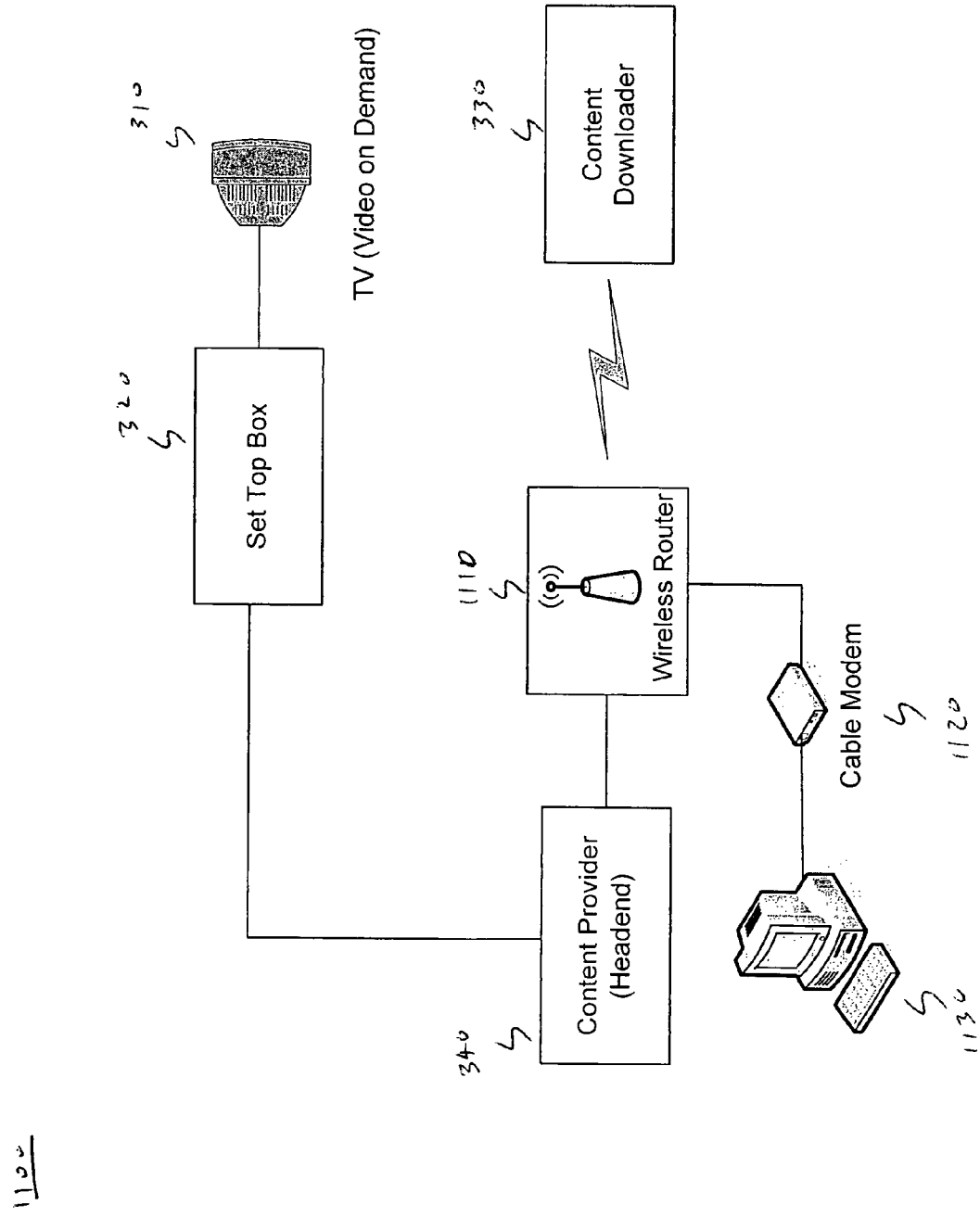
FIG. 11 shows one system embodiment of the present invention for downloading content to a content downloader.

Referring now to FIG. 11, one system embodiment of the present invention for downloading content to a content downloader is shown. System 1100 is similar to the system described in FIG. 10. In this embodiment, however, the content downloader 330 is coupled to the content provider 340 through a wireless router 1110. Accordingly, the content downloader 330 is in communication with the content provider 340 wirelessly. Moreover, the wireless router 1110 may be further coupled to a cable modem 1120 and a PC 1130. It is appreciated that the cable modem 1120 or the PC 1130 may be further coupled to a server (not shown). Accordingly, content stored on the content downloader 330 may become accessible to other electronic devices that are coupled to the server. Moreover, coupling the content downloader 330 to the server enables the subscriber to upload content such as personal pictures to the server.

Figure 12:
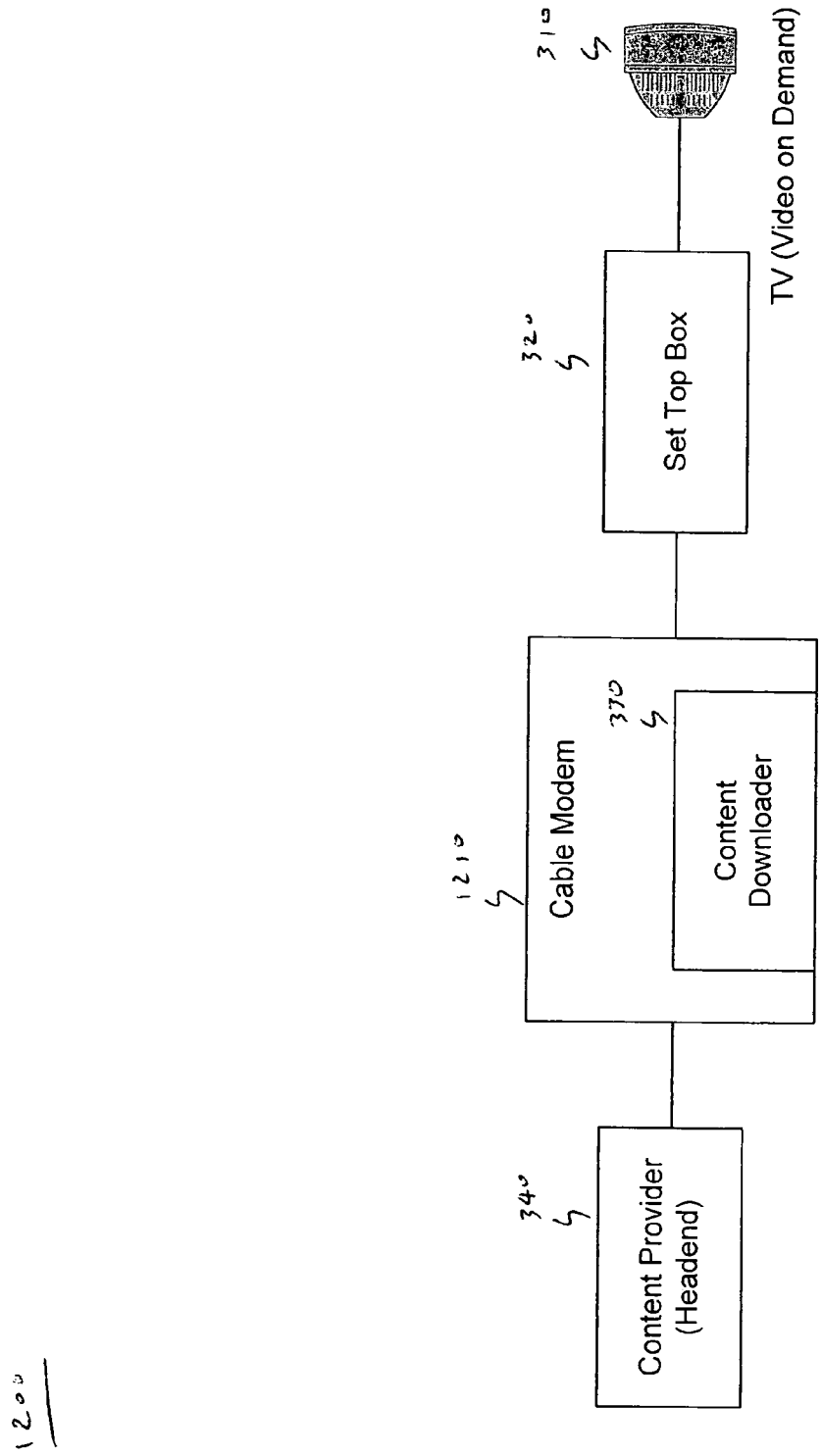
FIG. 12 shows one system embodiment of the present invention for downloading content to a content downloader.

Referring now to FIG. 12, one system embodiment of the present invention for downloading content to a content downloader is shown. In this embodiment, the content downloader 330 is integrated within a cable modem 1210. In this embodiment, the subscriber uses the user interface generated by the set-top-box 320 and displayed by a display such as a television set 310 to select content for download. The content is then downloaded from the content provider 340 to the content downloader 330 which is part of the cable modem 1210. It is appreciated that the cable modem 1210 may be further coupled to other electronic devices such as a PC (not shown) or a server (not shown). The cable modem 1210 may be used to network the content downloader 330 and other electronic devices together. Similar to before, coupling the content downloader 330 to the server enables the subscriber to upload content such as personal pictures to the server.

Figure 13:
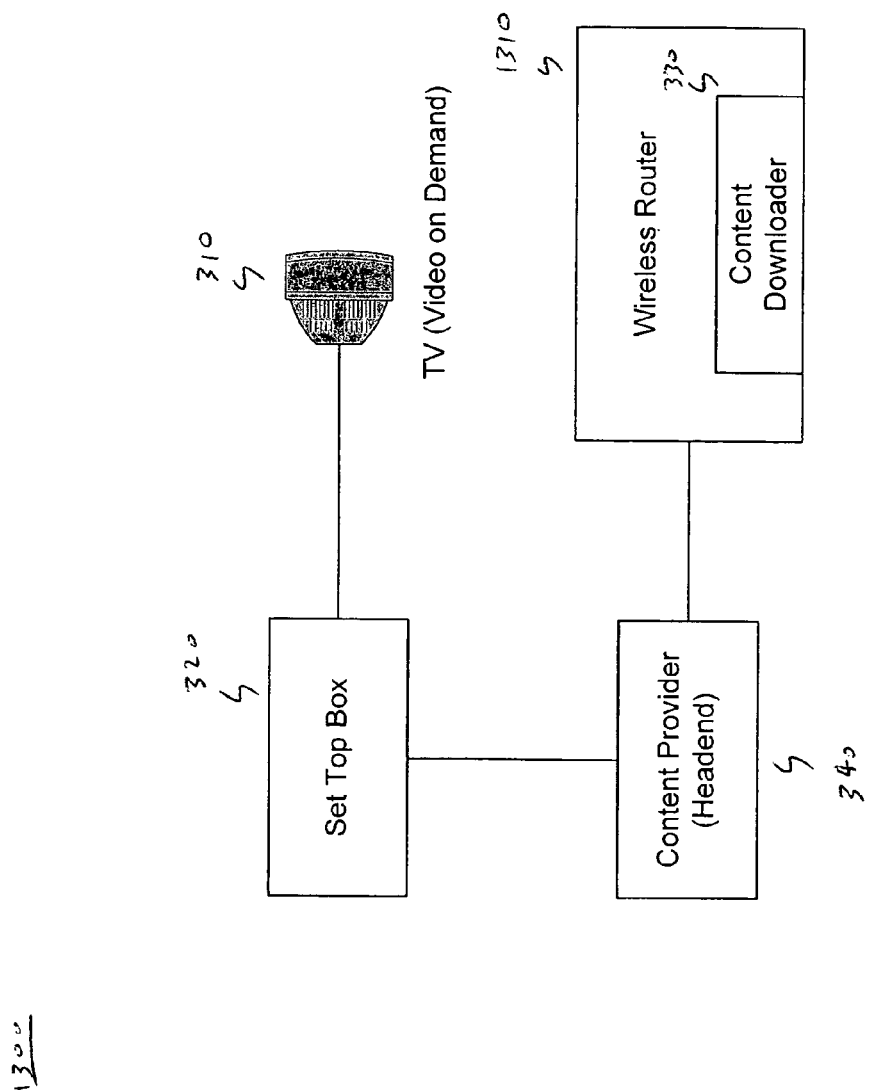
FIG. 13 shows one system embodiment of the present invention for downloading content to a content downloader.

Referring now to FIG. 13, one system embodiment of the present invention for downloading content to a content downloader is shown. In this embodiment, the content downloader 330 is integrated within a wireless router 1310. Similar to before, the subscriber may use the user interface generated by the set-top-box 320 which is displayed by a display such as a television set 310 to select content for download. The content is then downloaded from the content provider 340 to the content downloader 330 which is part of the wireless router 1310. It is appreciated that the wireless router 1310 may be further coupled to other electronic devices such as a PC or a server (not shown). The wireless router 1310 may be used to network the content downloader 330 and other electronic devices together. For example, the wireless router 1310 may be used to network the content downloader 330 and a PSP device (not shown). Similarly, the wireless router 1310 may be used to network the content downloader 330 and a PC, a server and an IPod (not shown).

Figure 14:
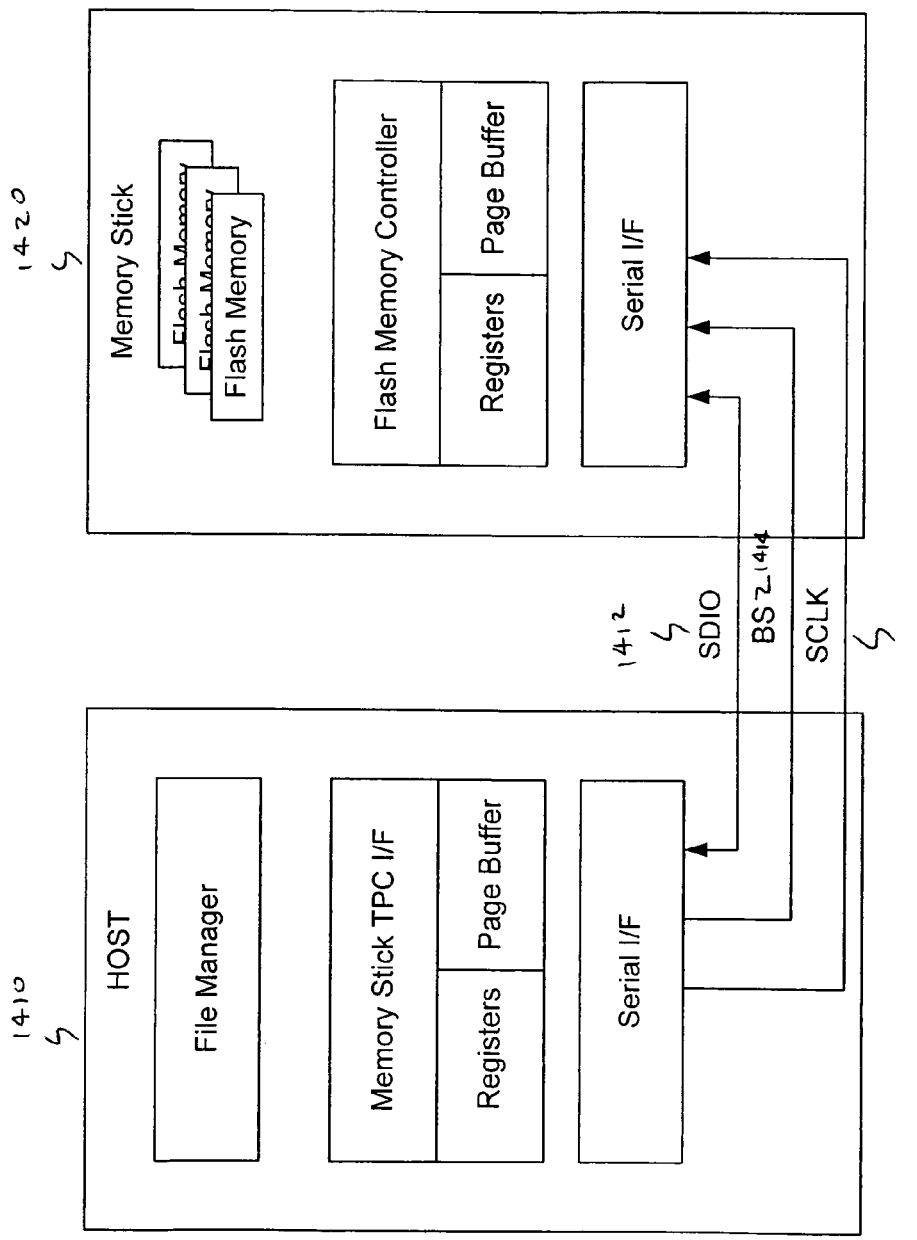
FIG. 14 shows one system embodiment of the present invention for creating a folder in a content downloader for storing a downloaded content.

Some electronic devices require content to be stored in certain folders for location thereof. Referring now to FIG. 14, one system embodiment of the present invention for creating a folder in a content downloader 330 for downloading content is shown. For example, music files for a PSP device may be required to be written into a special folder such as PSP/MUSIC. Similarly, pictures for a PSP device may be required to be written into a special folder such as PSP/PHOTO. In this embodiment, a folder is created if a folder is not present on the flash memory of the content downloader 330.

In one embodiment, the content provider 340 as a host 1410 sends a plurality of signals (e.g., SDIO 1412, BS 1414 and SCLK 1416) with default folder names to the memory component (e.g., memory stick 1420) of the content downloader 330. Upon receiving the signals from the host 1410 the content downloader 330 creates the default folder in the memory stick 1420 if the default folder is not present.

Alternatively, the content provider 340 may send simple read/write and paging commands to the content downloader 330. The content provider 340 may then examine the memory and determine the appropriate course of action depending on the target player(s). In one embodiment the content provider 340 may create the required folder in the content downloader 330.

Figure 15A:
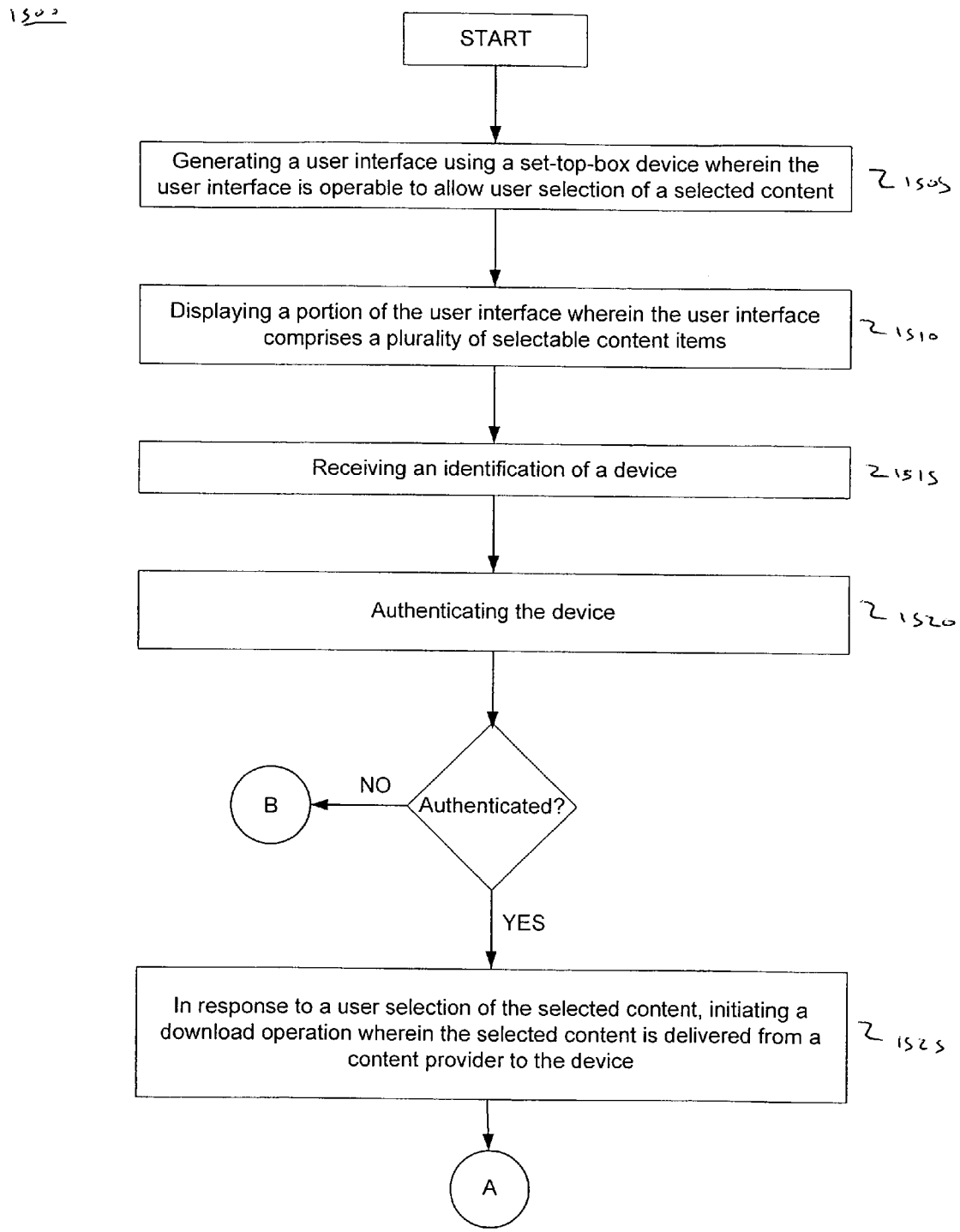
FIG. 15A shows a flow diagram for downloading content to a content downloader in accordance with one embodiment of the present invention.
Figure 15B:
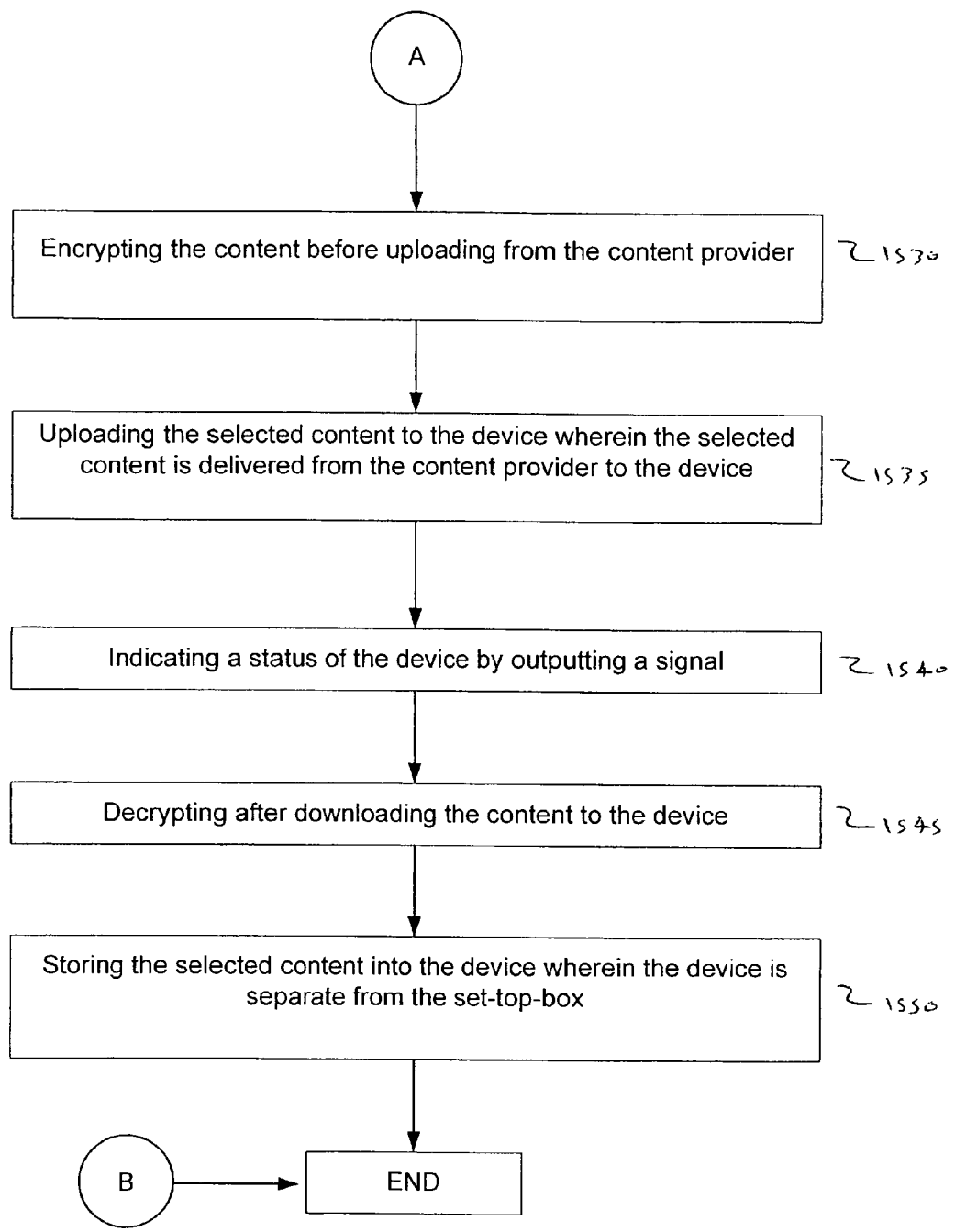
FIG. 15B shows a flow diagram for downloading content to a content downloader in accordance with one embodiment of the present invention.

Referring now to FIG. 15A, a flow diagram 1500 for one embodiment of the present invention for downloading content to a content downloader is shown. At step 1505 a set-top-box 320 generates a user interface. The user interface allows a user to select content by navigating a series of menus and/or windows. In the preferred embodiment of the present invention, the generated user interface provides a television-centric experience.

At step 1510, the generated user interface is displayed. The user interface contains a series of selectable items. For example, a user interface may have a number of tabs (e.g., Music, Video, PSP). The user may then activate a selectable tab (e.g., Music). After making a selection, the user is presented with further selectable options. For example, the user may be asked whether the user wishes to download R&B music, Classical music, or Hip-Hop music. Furthermore, the user may be asked to select the artist, or the recording studio, or the desired album and finally select the desired music content.

At step 1515, the content provider 340 receives the identification of the device (e.g., content downloader 330). The content provider 340 authenticates the device by comparing the identification of the device with identification of other pre-registered devices. In one embodiment, if the content provider 340 finds a match and if the subscriber is in good standing, the content may be downloaded to the content downloader 330.

If the device is not successfully authenticated, the process for downloading content terminates. Optionally, an error message may be displayed on screen indicating the reason why authentication failed. Moreover, additional information such as contact information for the content provider 340 may be displayed in order to resolve the problem.

If the device is successfully authenticated, at step 1525 the download is initiated in response to a user selection of a downloadable content. When the content download is initiated, the downloadable content is prepared for download from the content provider 340 to the device (e.g., content downloader 330).

At step 1530 in preparation of the download, for security purposes and for preventing unauthorized access to the content, the content may be encrypted. In one embodiment, the user may be asked to select the proper encryption scheme. Alternatively, the content provider 340 may automatically select the appropriate encryption scheme.

At step 1535 the selected content is uploaded from the content provider 340 to the device (e.g., content downloader 330). At step 1540 the status of the device and the download is indicated. For example, the device may output a message on a display screen indicating that the device does not have sufficient memory to store the selected content. Similarly, the device may output a message indicating that the download is in progress or that the download has been completed. In other embodiments of the present invention, indicating the status of the device is achieved using LEDs. For example, a flashing red light may indicate that a download is in progress. Similarly, a solid red light may indicate that the content downloader 330 has insufficient memory and a solid green light may indicate that the content has been downloaded successfully.

At step 1545, the downloaded content is decrypted in order to make the content accessible. At step 1550, the received content is stored in the device (e.g., content downloader 330). It is appreciated that the device for storing the content is a device separate from the set-top-box 320. Alternatively, the encrypted content may be stored in the device. It is appreciated that the steps for the above method may be in a sequence other than the one presented and described.

The embodiments of the present invention may be extended to enable a user to select a target device for downloading content instead of a content downloader. A method and system for uploading/downloading content to a target device, enabling a user/subscriber to select a target device for downloading content to, is described below.

A Method and System for Uploading Content to a Target Device

Figure 16:
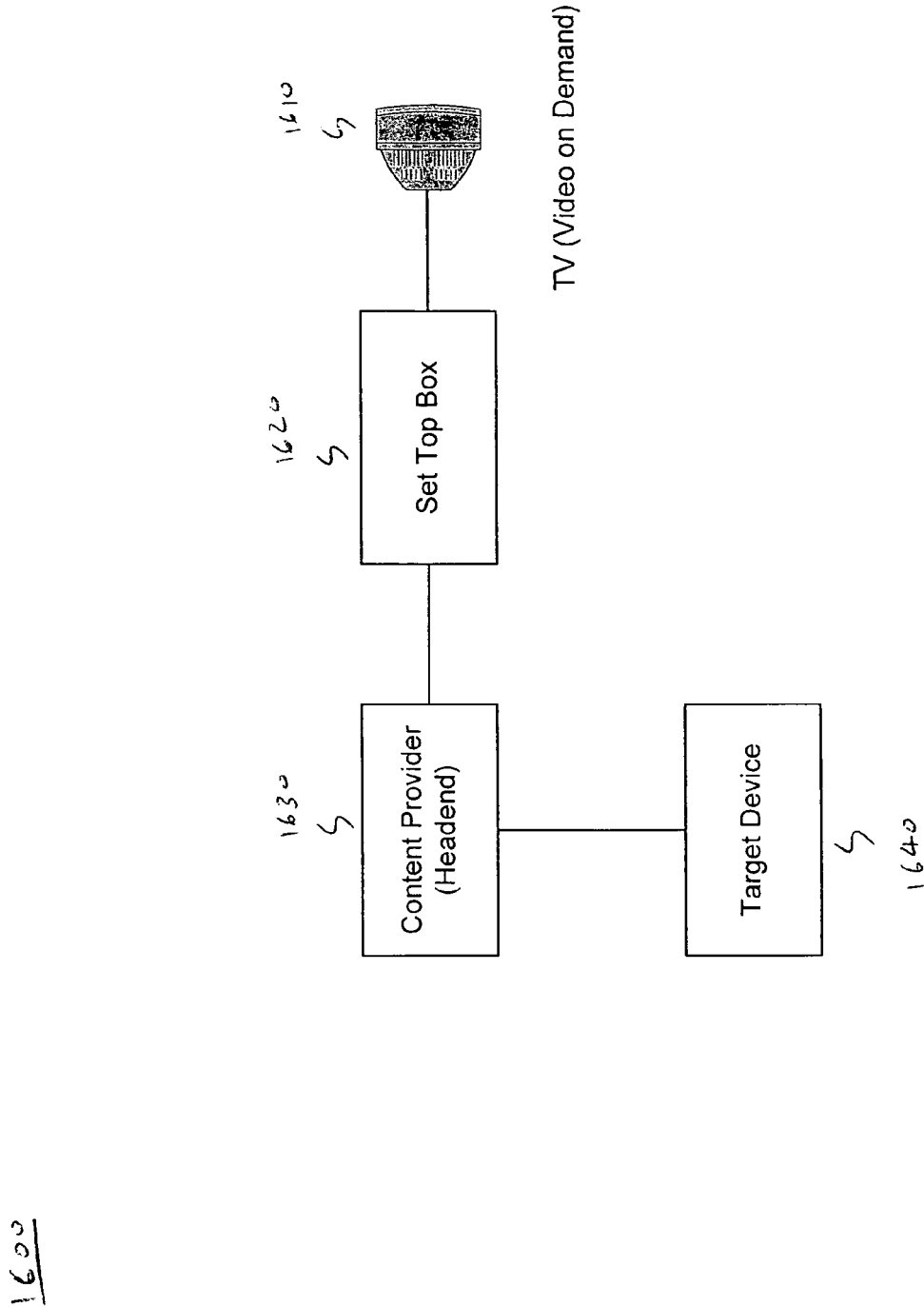
FIG. 16 shows one embodiment of the present invention for uploading content to a target device.

Referring now to FIG. 16, one system embodiment of the present invention for downloading content to a selected target device is shown. In this embodiment of the present invention, a display 1610 (e.g., a television set) for displaying a user interface is coupled to a set-top-box 1620. The user interface is generated by the set-top-box 1620 and enables a user to find and select a particular downloadable content. Moreover, the user interface enables a user to select at least one target device 1640, for downloading the selected content. The set-top-box 1620 in addition to generating the user interface, receives an indication of the selected content for download to the selected target device 1640. The set-top-box 1620 is further coupled to a content provider 1630 (e.g., a cable service provider). The content provider 1630 provides the content in response to the user command. Furthermore, the content provider 1630 may provide a list of target devices available for receiving the selected content.

System 1600 provides a system whereby a subscriber can use a set-top-box 1620 to select a downloadable content for a target device 1640, separate from the set-top-box 1620, in a television-centric experience. System 1600 eliminates the need to transfer the downloaded content from one electronic device to another because the content may be downloaded directly to the selected target device.

In one embodiment of the present invention, at least one target device is registered with the content provider 1630 prior to selecting the content and the target device. In one embodiment, target devices may be registered through a human operator. Alternatively, target devices may be registered through a customer support website with very little or no user involvement. For example, the target device 1640 may be coupled to the content provider 1630 and automatically register the target device 1630 by sending its corresponding information to the content provider.

In the preferred embodiment of the present invention, connecting the target device 1640 to the content provider 1630 automatically detects and registers the target device. Therefore, information such as MAC address and the serial identification number and other information may be provided to the content provider 1630 automatically. Alternatively, the user may provide the target device information through the customer support website.

Figure 17:
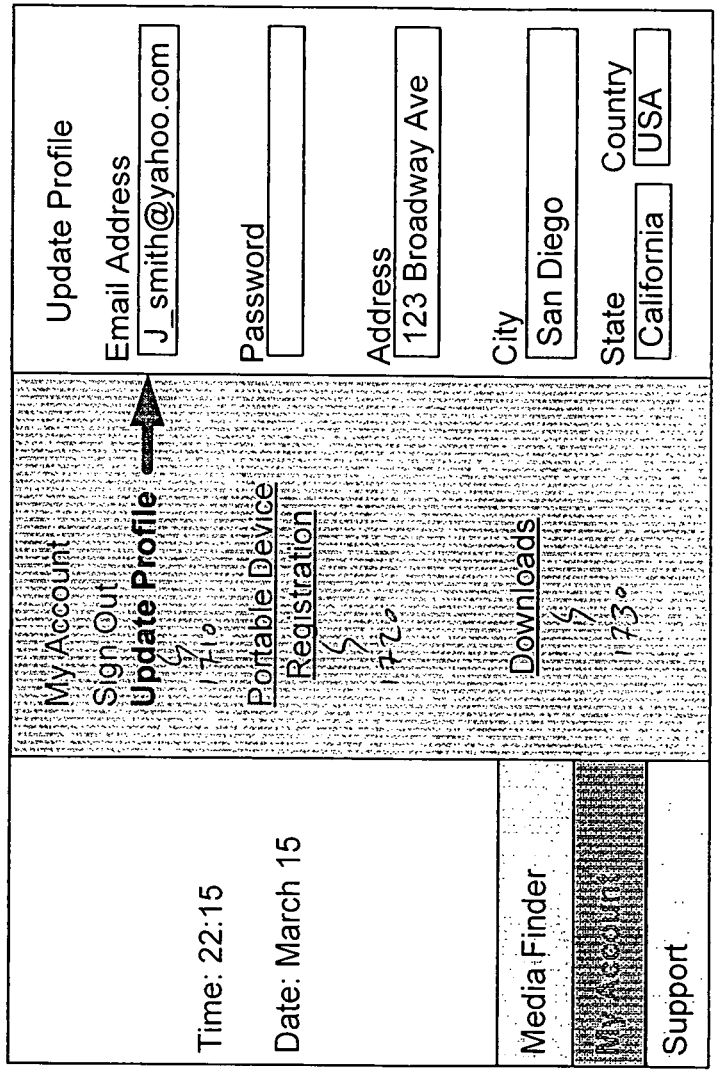
FIG. 17 shows a user interface for accessing subscriber information in accordance with one embodiment of the present invention.

Referring now to FIG. 17, an exemplary user interface for registering a target device 1640, modifying user information and monitoring downloads in accordance with one embodiment of the present invention is shown. The user interface enables the user to update profile by selecting an update profile 1710 tab. By selecting the update profile 1710 tab, the user can modify user's profile such as email address, password, and address. Moreover, the user may wish to register target devices by selecting the portable device registration 1720 tab. Selecting the portable device registration 1720 tab enables the user to register target devices by specifying their respective MAC address and by specifying the player type. Additionally, the user may monitor downloads by selecting the download 1730 tab. Selecting downloads 1730 tab enables the user to monitor past downloads as well as downloads in progress. The user may be provided with additional options (not shown). It is appreciated that the use of an on-screen tab is by way of example and not limitation. As such, it is appreciated that selectable means other than a tab may be employed in order to select an appropriate action. For example, a selectable option may be through a drop down menu, a pop-up window or a link. It is further appreciated that the user interface may be a graphical user interface.

After a target device is registered with the content provider 1630, a subscriber may use the user interface provided by the set-top-box 1620 to navigate a selectable menu in order to find and select a downloadable content. Moreover, the subscriber may use the user interface provided by the set-top-box 1620 to select a target device 1640 for receiving the downloadable content. When the content and the target device are selected, the content provider 1630 (e.g., a cable service provider) is contacted.

In the preferred embodiment of the present invention, a target device is selected before selecting the content for several reasons. The type of target device may result in a different content format. For example, some target devices are audio only versus other target devices that may be audio as well as video. The type of target device may require a corresponding codec. Moreover, the bit rate and frame rate of one target device varies from another. Additionally, the type of target device may dictate the resolution and the screen size. Furthermore, the type of target device may dictate the type of DRM and player security.

Moreover, in addition to the reasons provided above, device specific content has other advantages including optimizing flash memory space, optimizing system bandwidth and download time, and simplifying content offerings to the subscribers. For example, video on a SonyEricsson cell phone is $\frac{1}{16}$ Common Intermediate Format (CIF) as compared to a PSP which is $\frac{1}{4}$ CIF. Therefore, in comparison the amount content downloaded to a SonyEricsson cell phone is $\frac{1}{4}$ of the file size of a PSP. Consequently, at an equivalent bit rate, it takes the SonyEricsson cell phone less time to download the content. As another example, Net Walkman only offers music or audio books and does not render video. Therefore, knowing the specific target device simplifies the content offerings to subscribers because video content is not offered to subscribers knowing that Net Walkman does not render video thereby simplifying content offerings to subscribers. Moreover, inherent player security might allow the content provider 1630 to offer content for a particular target device over other target devices because one may be perceived as more secure. For example, embedded flash may be perceived as being more secure because it cannot be copied to other devices and that the content can only be erased. Accordingly, the content is protected from being transferred without authorization (e.g., without purchasing the product).

Figure 18:
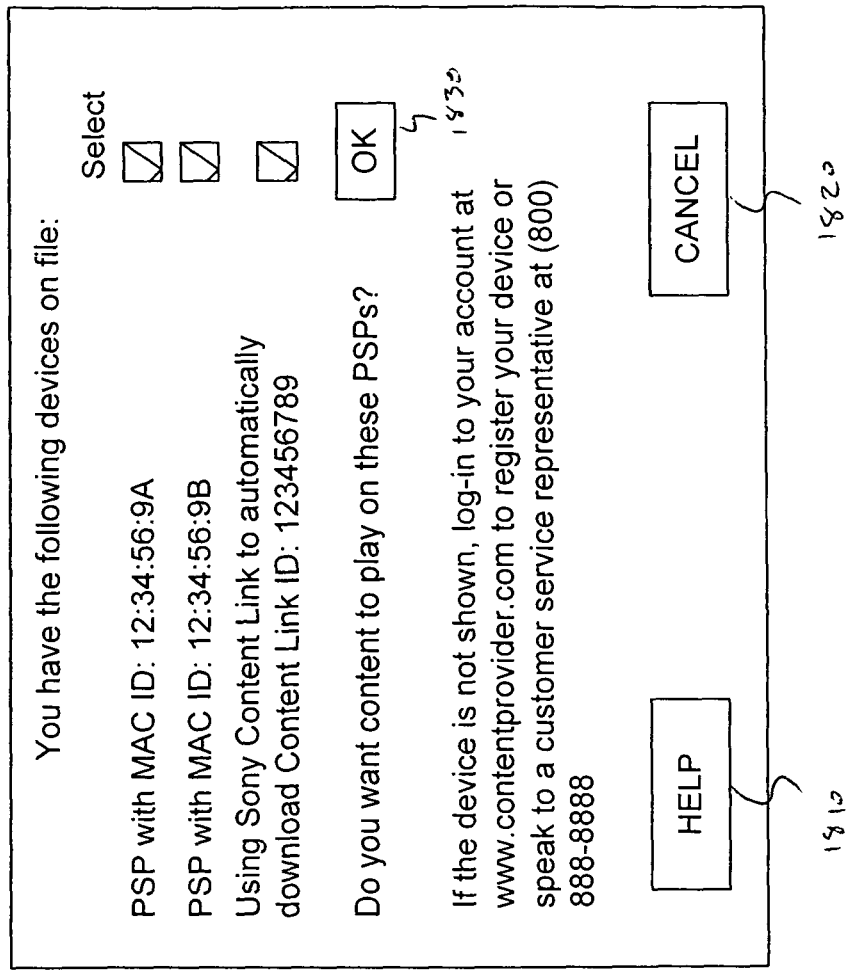
FIG. 18 shows a user interface for displaying available target devices for downloading content in accordance with one embodiment of the present invention.

Referring now to FIG. 18, a list of target devices available for downloading content is presented to the user. In this example, the subscriber has previously registered three target devices, two PSP devices and a Sony Content Link. The two exemplary PSP have MAC address of 12:34:56:9A and 12:34:56:9B respectively. The third target device, the Sony Content Link, has a MAC address of 123456789. In other embodiments, additional target devices may be pre-registered and displayed.

From the list of available target devices, the subscriber selects at least one target device for downloading the selected content. In the preferred embodiment of the present invention, if the desired target device is not listed or in order to register the target device, the subscriber may contact the content provider 1630 by calling the content provider 1630 or by simply logging into the subscriber's account. Alternatively, the subscriber may seek additional help by selecting a help 1810 tab. Alternatively, the subscriber may wish to cancel target device selection by selecting the cancel 1820 tab. The subscriber may, however, proceed with target device selection by selecting the desired target device and selecting the ok 1830 tab.

Figure 19:
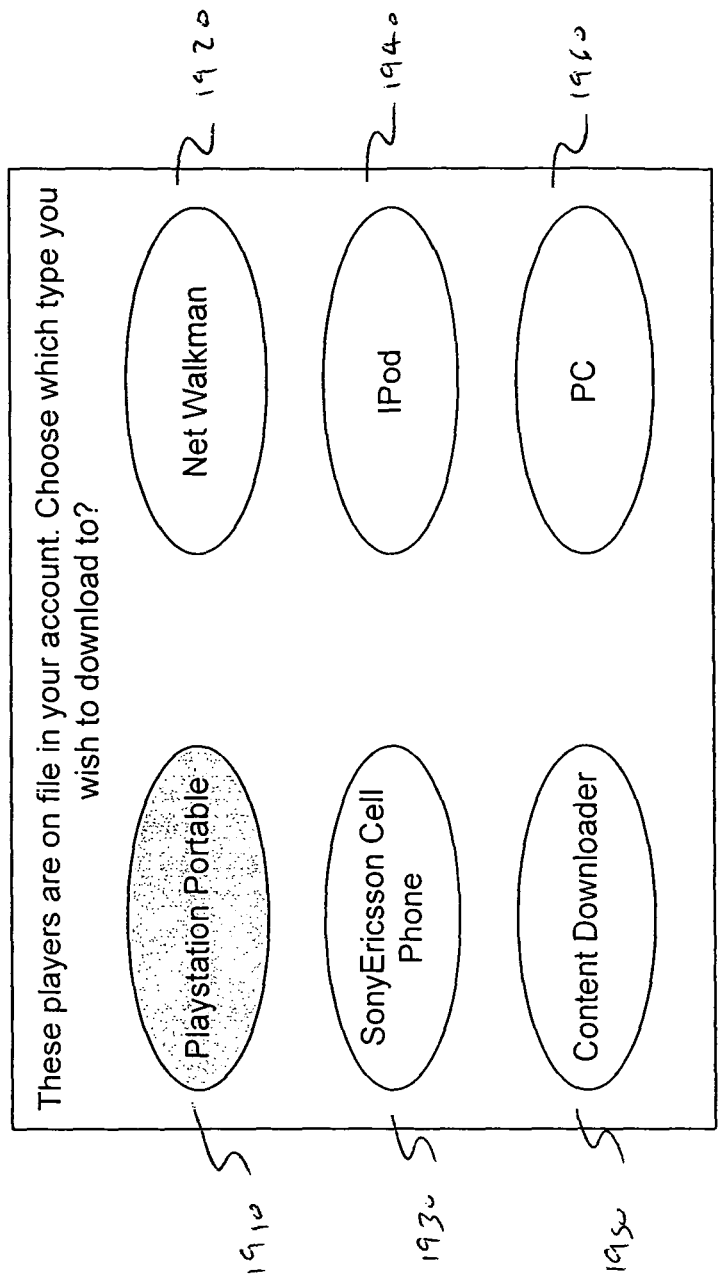
FIG. 19 shows a user interface for selecting a target device in accordance with one embodiment of the present invention.

After selecting the target device, the subscriber may select the type of the target device. Referring now to FIG. 19, an interface for providing the subscriber with different types of players is shown. For example, in this embodiment the subscriber is provided with a set of target devices such as a playstation portable (PSP) 1910, Net Walkman 1920, SonyEricsson Cell Phone 1930, IPod 1940, Content Downloader 1950 and PC 1960. In this example, the subscriber has selected PSP 1910. is appreciated that the use of a tab is by way of example and not limitation. As such, it is appreciated that selectable means other than a tab may be employed in order to select an appropriate player. For example, a selectable option may be through a drop down menu, pop-up window or a link. It is further appreciated that the user interface may be a graphical user interface.

Figure 20:
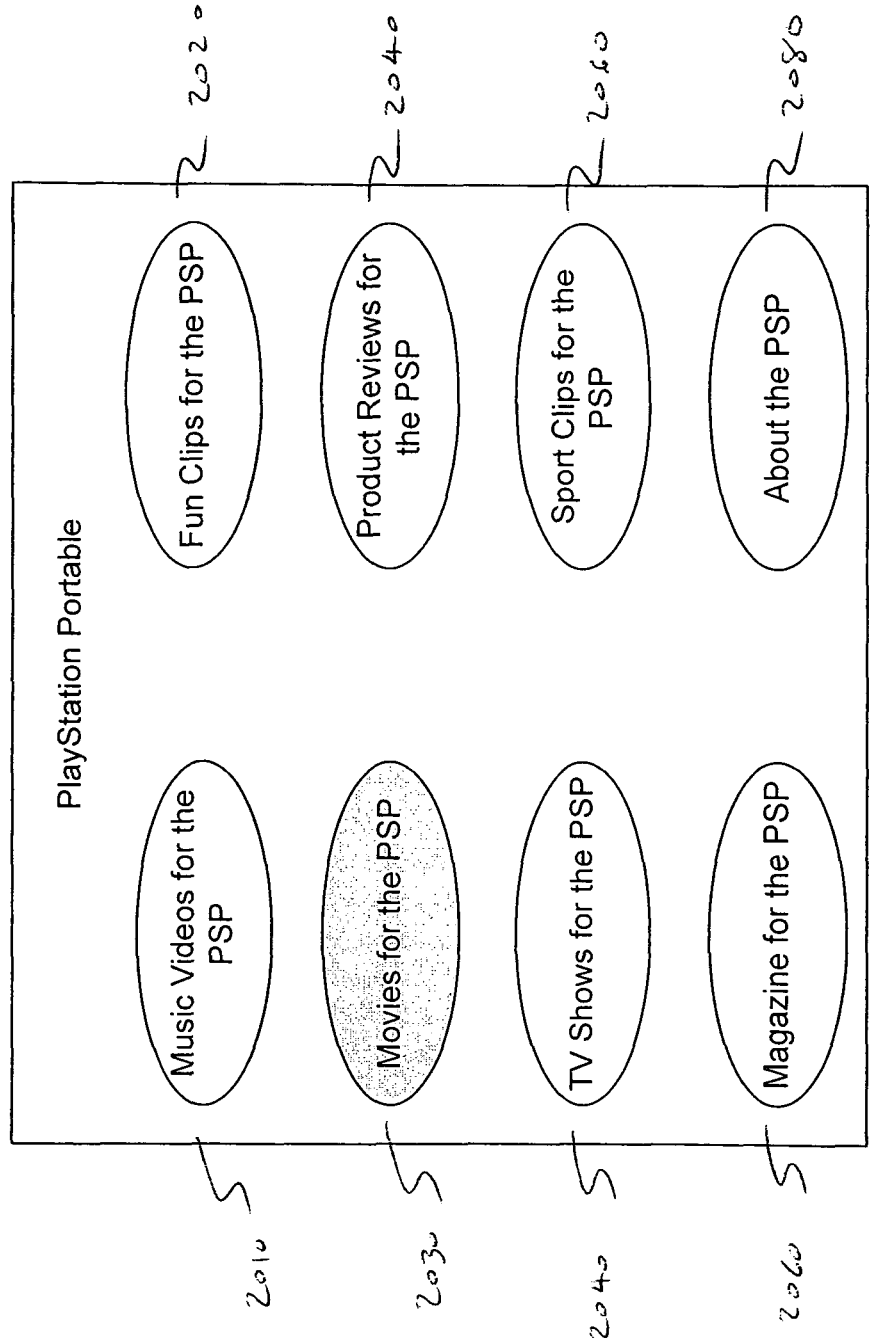
FIG. 20 shows a user interface for selecting a type of content download for a target device in accordance with one embodiment of the present invention.

After the subscriber has selected the target device for downloading content, the subscriber proceeds to selecting content types and the content offering available for that player. Referring now to FIG. 20, a user interface for providing the subscriber with various content types is shown. In this embodiment, the subscriber may select various content types for a selected PSP. For example, the subscriber may select Music Videos 2010, Fun Clips 2020, Movies 2030, Product Review 2040, TV Shows 2050, Sport Clips 2060, Magazine 2070 or alternatively choose to learn about the PSP by selecting the About the PSP 2080 tab.

In this embodiment, a subscriber may wish to watch a movie on a flight to New York as presented before. Therefore, using the interface, the subscriber selects the Movies 2030 tab. It is appreciated that the use of a tab is by way of example and not limitation. As such, it is appreciated that selectable means other than a tab may be employed in order to select an appropriate content type. For example, a selectable option may be through a drop down menu, pop-up window or a link. It is further appreciated that the user interface may be a graphical user interface.

By selecting the Movies 2030 tab, the subscriber is presented with a set of available downloadable movies as shown above in FIG. 5. As discussed above, the subscriber selects the movie, Cheaper by the Dozen.

Figure 21:
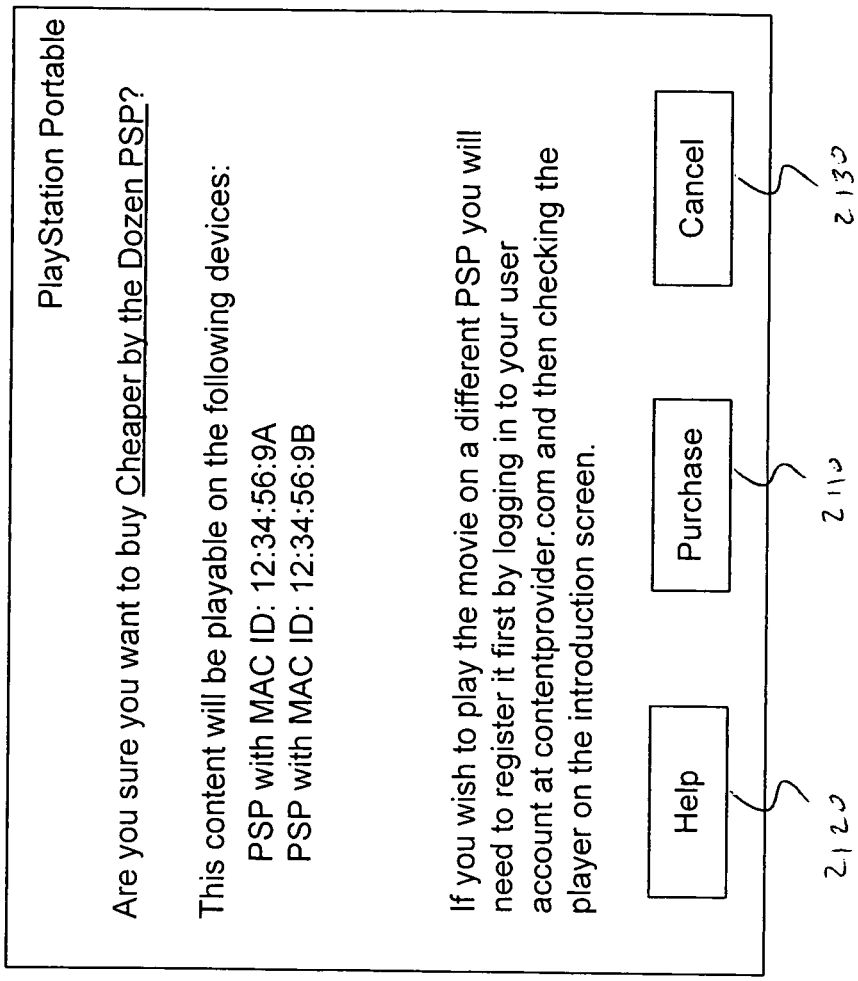
FIG. 21 shows a user interface for confirming the selection of the content and the target device in accordance with one embodiment of the present invention.

In one embodiment of the present invention, a user interface is used to confirm the selection of the target device 1640 as well as confirming the selection of content which in this example is Cheaper by the Dozen. Referring now to FIG. 21, the subscriber is asked to confirm the selection of the content for download as well as confirming the MAC address of the target devices selected for download. In this embodiment, the subscriber is asked whether the selected content is Cheaper by the Dozen and whether the target devices selected for downloading content are the two PSP devices with their respective MAC address of 12:34:56:9A and 12:34:56:9B. Moreover, a message may be displayed to the subscriber that in order to select a different target device (e.g., a PSP), the subscriber should log into the user account and register the target device before selecting the target device for content download. In this embodiment, the subscriber may confirm the selection by selecting the purchase 2110 tab. Alternatively, the subscriber may seek help and additional information may be displayed by selecting the help 2120 tab. Additionally, the subscriber may cancel the selection at any time by selecting the cancel 2130 tab. It is appreciated that the use of a tab is by way of example and not limitation. As such, it is appreciated that selectable means other than a tab may be employed in order to confirm the selection. For example, a selectable option may be through a drop down menu, pop-up window or a link. It is further appreciated that the user interface may be a graphical user interface.

It is appreciated that in one embodiment, the price for the content may be adjusted to reflect the number of players/target devices allowed to play the content. Moreover, there may be a limit to the total number of players/target devices allowed to play the content.

Figure 22:
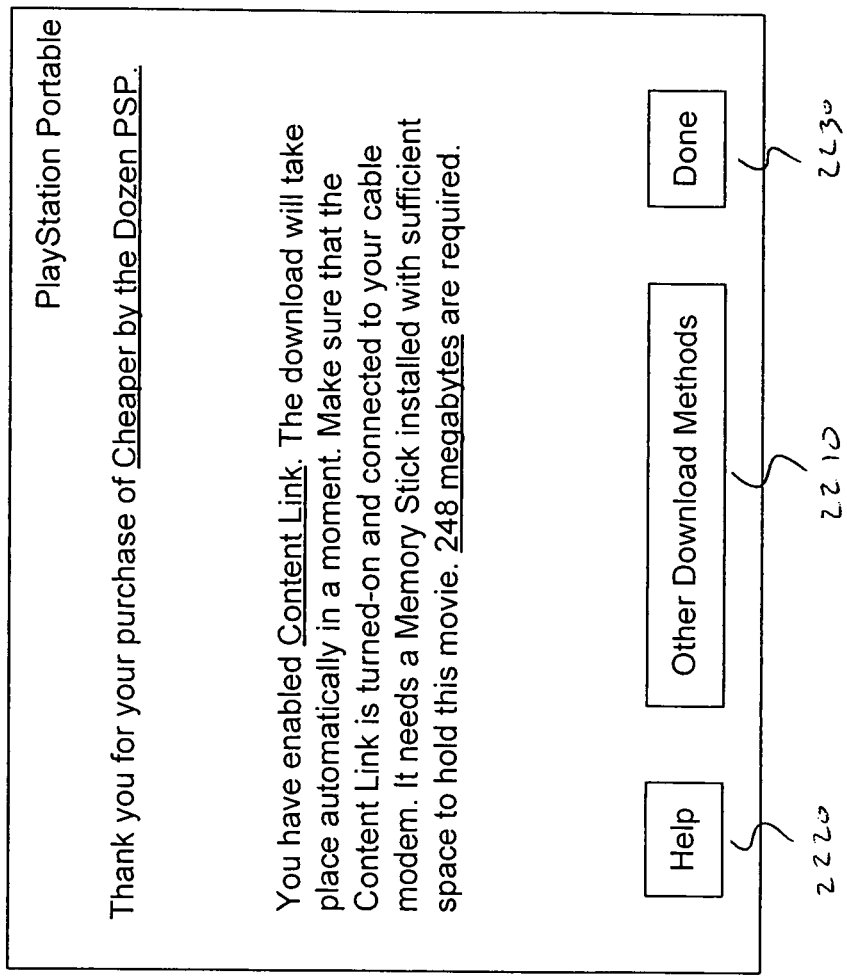
FIG. 22 shows a user interface for providing the subscriber with additional options in accordance with one embodiment of the present invention.

Referring now to FIG. 22, the subscriber may be thanked for purchasing content for download to the selected target device. In the preferred embodiment of the present inventions, the subscriber is provided with additional information including the amount of memory needed to complete the download. In this embodiment, the subscriber is reminded that 248 megabytes of memory is needed to store the content.

In the preferred embodiment of the present invention, the subscriber is provided with additional options including selecting an alternative method for downloading the selected content by selecting the other download methods 2210 tab. Alternatively, the subscriber may seek help by selecting the help 2220 tab. The user may otherwise select to proceed with download of the selected content to the selected target device by selecting the done 2230 tab. It is appreciated that the use of a tab is by way of example and not limitation. As such, it is appreciated that selectable means other than a tab may be employed in order to select an appropriate action. For example, a selectable option may be through a drop down menu, pop-up window or a link.

Figure 23:
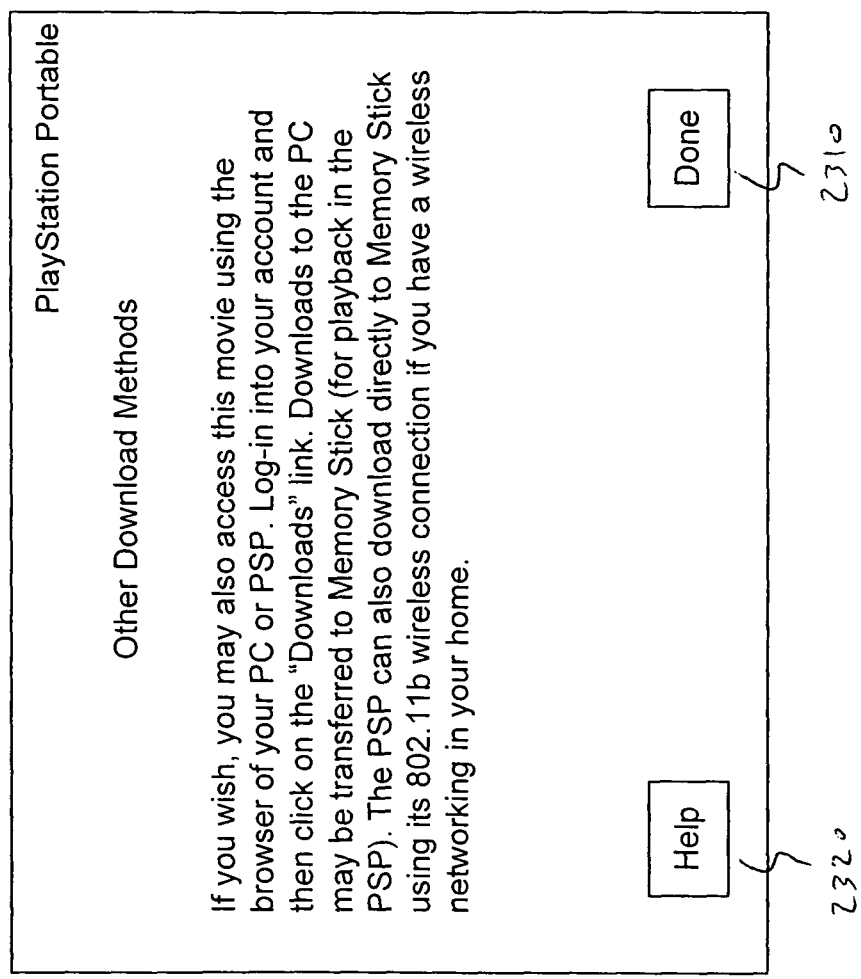
FIG. 23 shows a user interface for providing the subscriber with additional information in accordance with one embodiment of the present invention.

In this example, the subscriber wishes to download using other methods. Referring now to FIG. 23, a message is displayed, providing the subscriber with additional information as to other methods for downloading the selected content. For example, the subscriber may access the selected content using a PC or a PSP. Furthermore, the subscriber may log into the subscriber's account and select "Downloads" link 1730. Selecting "Downloads" link 1730, the subscriber may monitor previous content downloads as well as to choose the method for downloading content by selecting to download to a PC or a PSP. After selecting other methods for download, the subscriber may proceed by selecting the done 2310 tab. Alternatively, the subscriber may seek additional help by selecting the help 2320 tab. Optionally, the subscriber may cancel the selection and the content download (not shown). It is appreciated that the use of a tab is by way of example and not limitation. As such, it is appreciated that selectable means other than a tab may be employed in order to select an appropriate action. For example, a selectable option may be through a drop down menu, pop-up window or a link.

Figure 24:
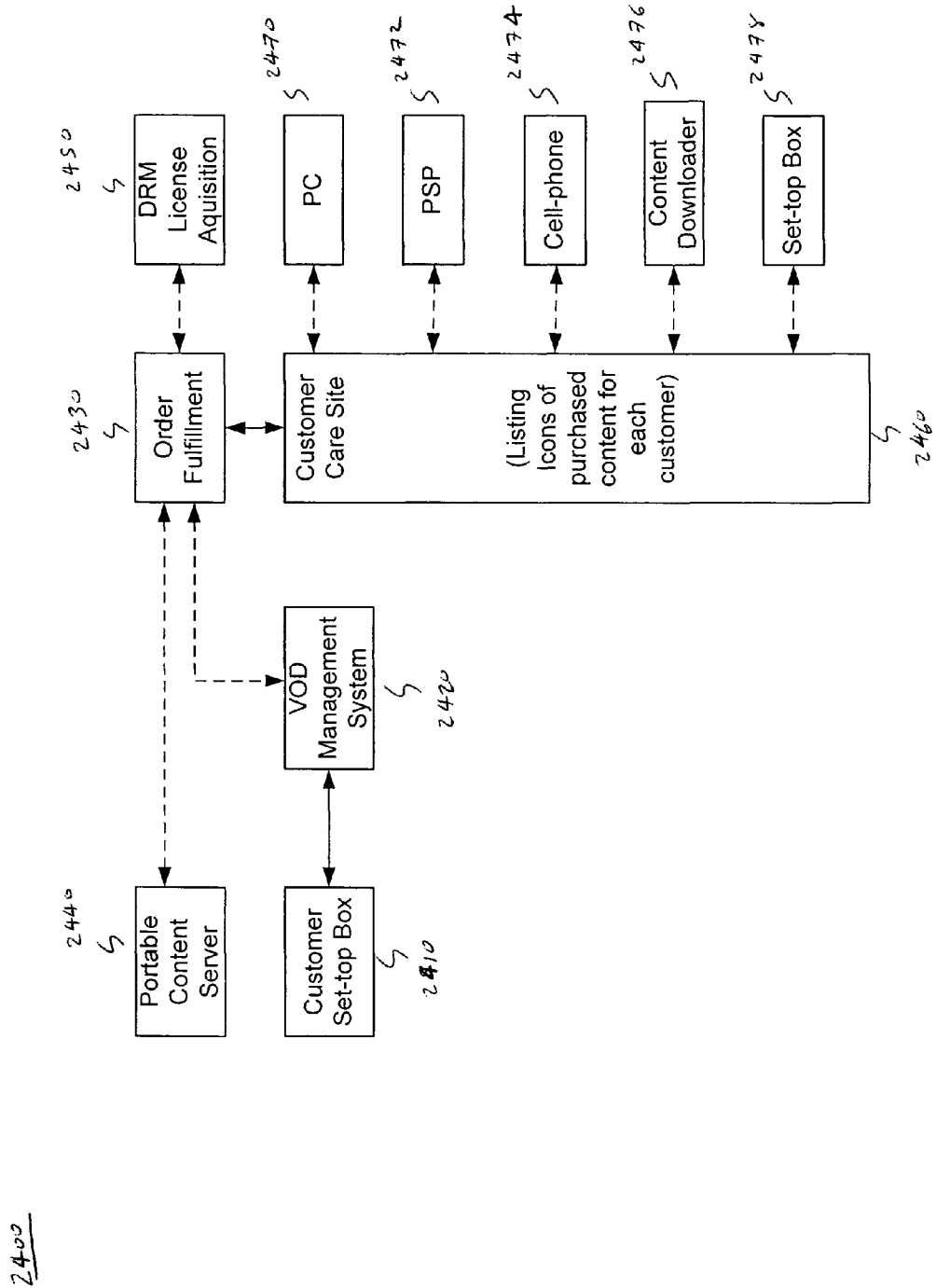
FIG. 24 shows one system embodiment of the present invention for downloading content to a target device in accordance with one embodiment of the present invention.

Referring now to FIG. 24, one system embodiment for downloading content to a target device is shown. After the subscriber proceeds with content download, the content provider 1630 identifies the selected content and the selected target device 1640. The set-top box 2410 may be coupled to a video on-demand (VOD) management system 2420 for associating devices with a customer account in the billing system. When a content download is requested, the database under VOD management system 2420 may be accessed to determine the type of target devices registered under a particular account. After identifying the selected content and the selected target device, the content provider 1630 determines whether the subscriber is in good standing and whether the target device is pre-registered. The VOD management system 2420, order fulfillment 2430, portable content server 2440, DRM license acquisition server 2450 and the customer care site 2460 are collectively referred to as a content provider.

The VOD management system 2420 is further coupled to an order fulfillment server 2430 for fulfilling the requested content for the selected target device. The order fulfillment 2430 server may be further coupled to a portable content server 2440 for providing content. Furthermore, the order fulfillment 2430 server may also be coupled to a DRM license acquisition 2450 server for providing an appropriate license for using the selected content for the selected target device.

The VOD management system 2420 may request a DRM packager to process the content for the customer's target device 1640. In one embodiment, the DRM determines the appropriate encryption key depending on a particular target device selected and the content selected. Unlike regular video on demand (VOD), which is fulfilled immediately through the set-top-box 1620, portable content and downloading to a target device is likely for a particular category of device like a PSP, cell phones, Blackberries and IPod to name a few. Therefore, the content provider 1630 may encrypt the content according to the proper encryption key for certain players in a customer's home network. In one embodiment, content is DRM encrypted (e.g., Marlin codes). Alternatively, the content provider 1630 may provide the subscriber with a list of available encryption keys and in response to the subscriber's selection the content provider 1630 encrypts the selected content.

In one embodiment of the present invention, content is pre-encrypted and stored on a server (e.g., a portable content server 2440). Accordingly, the target device receives the content and the license. Different methods may be used to handle the license. For example, the license may be appended to the content file. Alternatively, the license may be sent as a separate file. Moreover, the license may be obtained after the content download has been completed.

The content provider 1630 may also determine the appropriate format of the selected content for the selected target device 1640. Alternatively, the content provider 1630 may provide the subscriber with a list of available content formats, and in response to the subscriber's selection the content provider 1630 may encrypt the content.

The order fulfillment server 2430 may communicate with a customer care site 2460 when the content and the appropriate license are gathered. The content provider is further coupled to at least one target device. By way of example and not limitation, a plurality of target devices such as a PC 2470, PSP 2472, cell-phone 2474, content downloader 2476 and a set-top box 2478 are shown.

In one embodiment of the present invention, the selected target device continuously checks with the customer care site to determine whether a downloadable content is ready. If the content is available and sufficient memory exists, the target device downloads the content automatically. In other embodiments of the present invention, the target device may download the selected content manually, by initiating content download after receiving a message that a content is ready for download.

It is appreciated that at various steps, an error message may be displayed. For example, an error message may be displayed if a target device is not registered. Moreover, an error message may be displayed if no memory is installed, or if there is insufficient memory to download the content. Furthermore, an error message may be displayed if the memory is removed during the download.

Figure 25A:
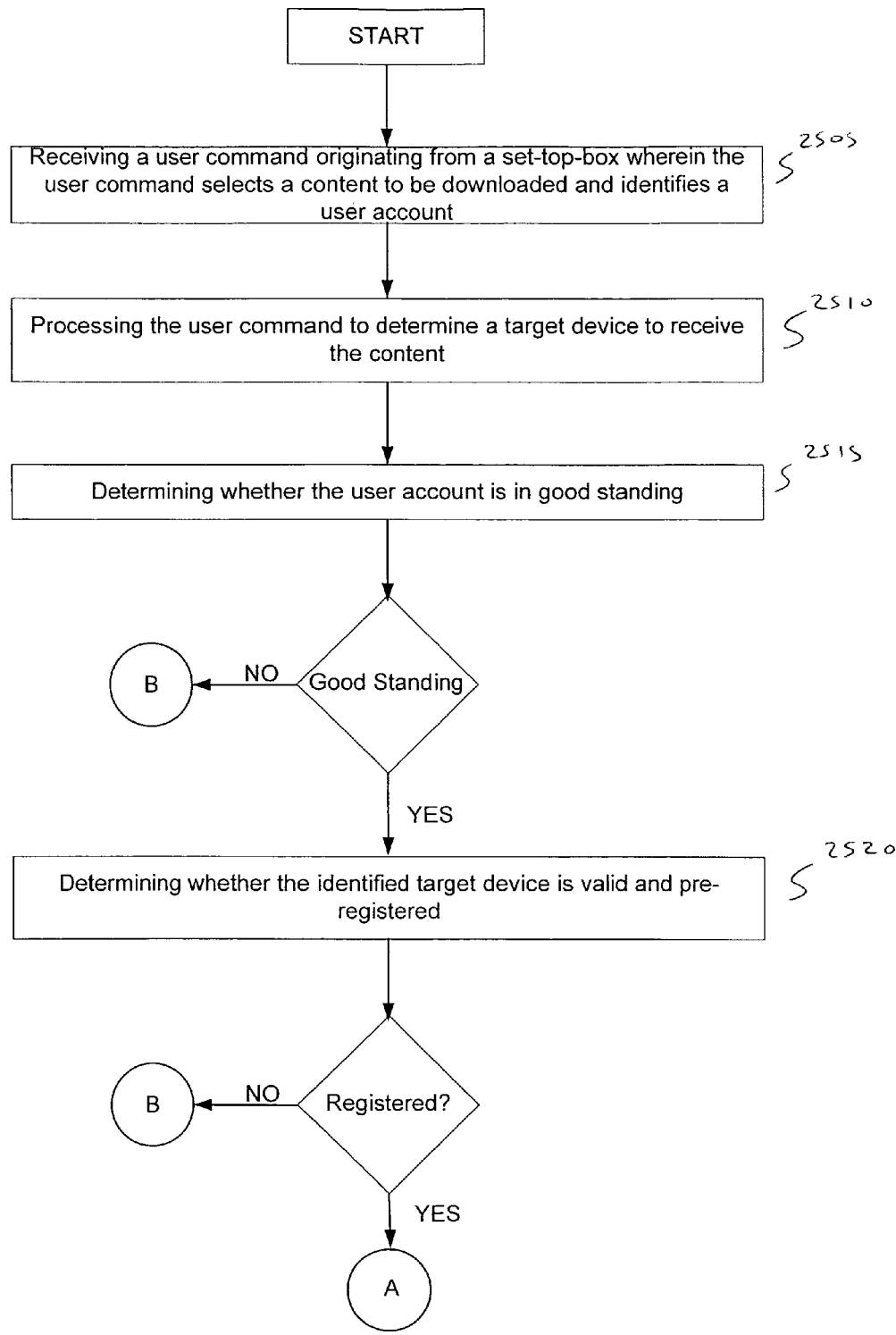
FIG. 25A shows a flow diagram for uploading content to the target device in accordance with one embodiment of the present invention.
Figure 25B:
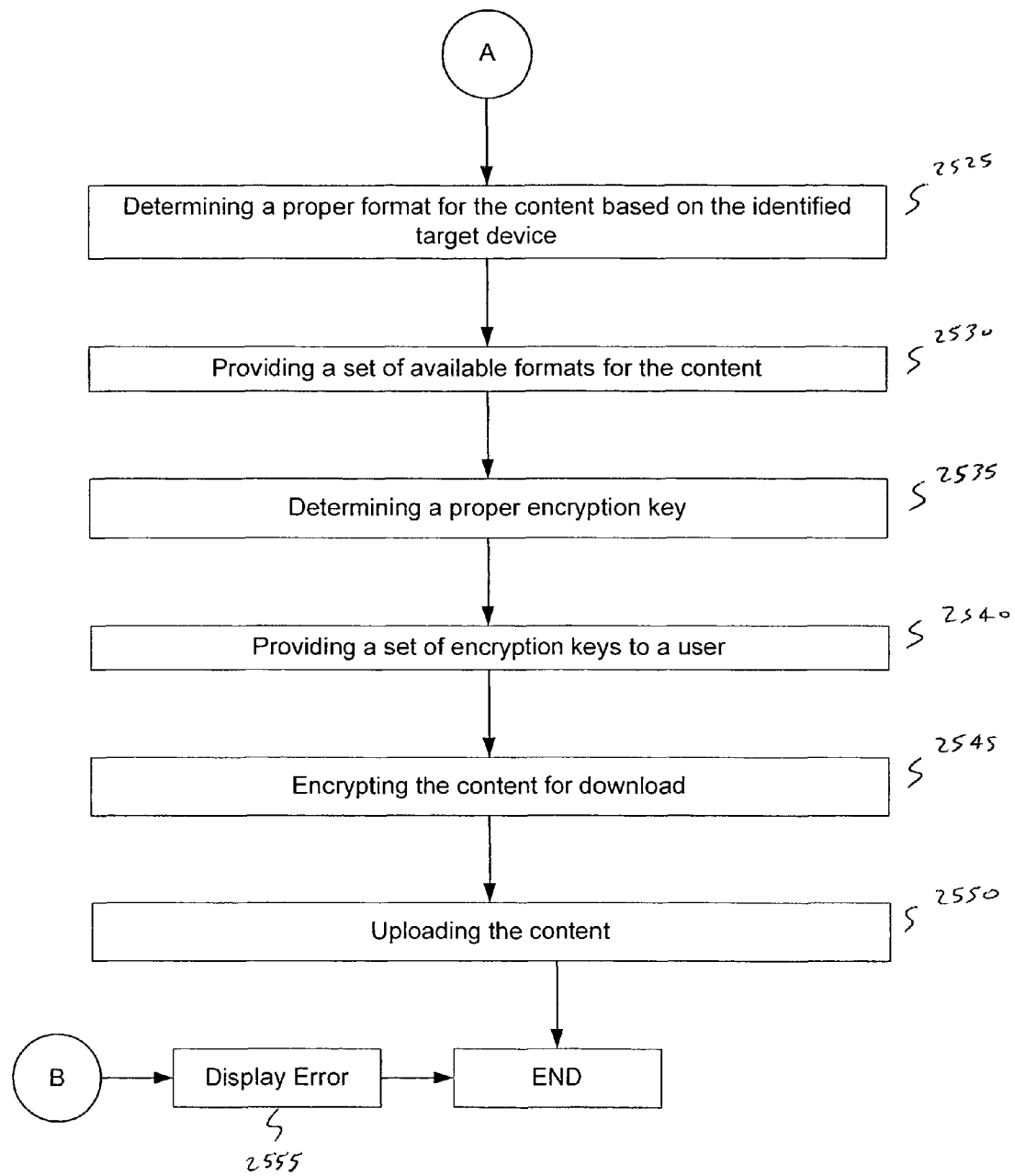
FIG. 25B shows a flow diagram for uploading content to the target device in accordance with one embodiment of the present invention.

Referring now to FIG. 25A, a flow diagram 2500 for one embodiment of the present invention for downloading content to a target device is shown. At step 2505, the content provider 1630 receives a command originating from a set-top-box 1620. The command indicates a selected content and the target device 1640 for downloading the selected content. Moreover, the command identifies a user account.

At step 2510, the content provider processes the received command. Processing the user command identifies the selected target device 1640. At step 2515, the content provider 1630 determines whether the subscriber is in good standing by using for example the VOD management system 2420. For example, the content provider 1630 may determine whether the subscriber has paid all purchased content in the past. Moreover, the content provider 1630 may determine whether the subscriber is approved by the credit card company specified in the user profile. If the subscriber is not found to be in good standing, at step 2555, an error message may be displayed indicating the reason why the subscriber was not found in good standing.

If the subscriber is found in good standing, at step 2520 the content provider 1630 determines and identifies the target device 1640 specified by the subscriber. The content provider 1630 determines whether the selected target device 1640 is valid and pre-registered with the content provider 1630 by using, for example, the VOD management system 2420. If the selected target device is found to be an invalid target device, at step 2555, an error message may be displayed indicating the reason why the target device is found to be invalid. In one embodiment, if the target device 1640 is not found to be registered, the subscriber may be provided with an option to register the target device 1640 (not shown).

If the target device 1640 is found to be registered, the content provider 1630 proceeds to step 2525. At step 2525, the content provider 1630 determines a proper format for the selected content for download to the identified target device 1640 and prepares the formatted content for download. In one embodiment, determining the proper format is based on the type of selected target device 1640. Alternatively, in one embodiment at step 2530, the content provider 1630 provides the subscriber with a set of available formats. The content provider 1630 in response to the subscriber's selection prepares the formatted content for download.

At step 2535, the content provider 1630 determines a proper encryption key for the selected content by using the DRM packager or DRM license acquisition 2450. In one embodiment, the proper encryption key is based on the selected target device. Alternatively, in one embodiment at step 2540, the content provider 1630 provides the subscriber with a set of available encryption keys and in response to the subscriber's selection proceeds to step 2545 and encrypts the selected content. At step 2450, the content provider 1630 uploads the encrypted content to the selected target device 1640.

The embodiments of the present invention may be extended such that a user of a target device is given the control and flexibility to accept or to refuse to download the selected content initiated by the set-top-box. A method and system for downloading content to the target device in response to acceptance by the user of the target device are described below.

A Method and System Downloading Content to a Target Device

In one embodiment of the present invention, after the target device and the content have been selected, the content provider 1630 does not automatically upload the content to the selected target device 1640. Instead, the content provider 1630 sends a message to the selected target device 1640 indicating that a downloadable content has been selected by the set-top-box 1620 and is ready for download. The user of the target device 1640 in response to the message from the content provider 1630 may wish to proceed with downloading the selected content. Alternatively, the user of the target device 1640 may wish to download the selected content at a subsequent time. Furthermore, the user of the target device 1640 may refuse to download the selected content. In one embodiment of the present invention the user of the target device may authorize a specific subscriber (e.g., a set-top-box) to upload content automatically. Alternatively, the user may reject all content downloads from a given subscriber. Moreover, the user may authorize download only through explicit authorization by the user.

Figure 26A:
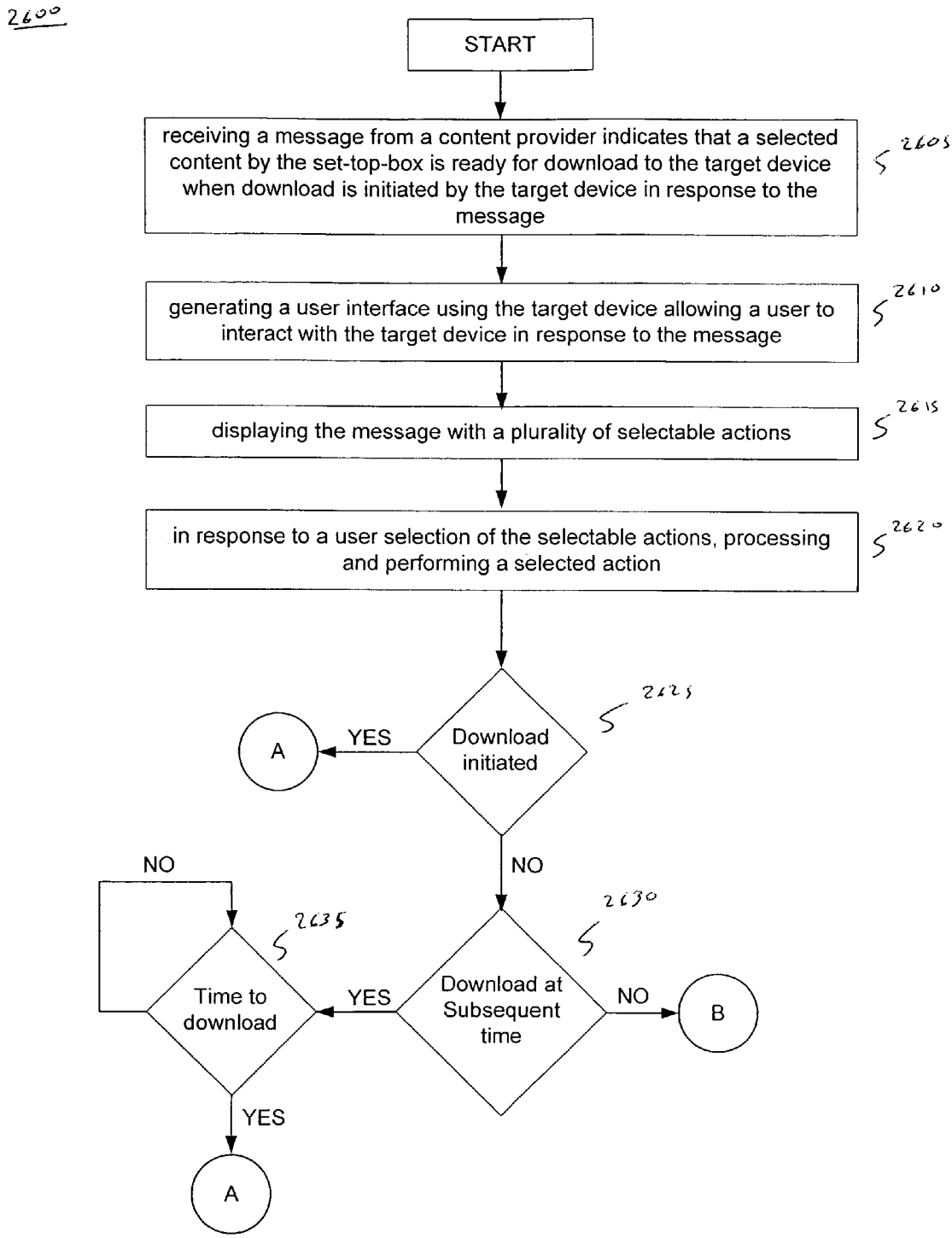
FIG. 26A shows a flow diagram for downloading content to a target device in accordance with one embodiment of the present invention.
Figure 26B:
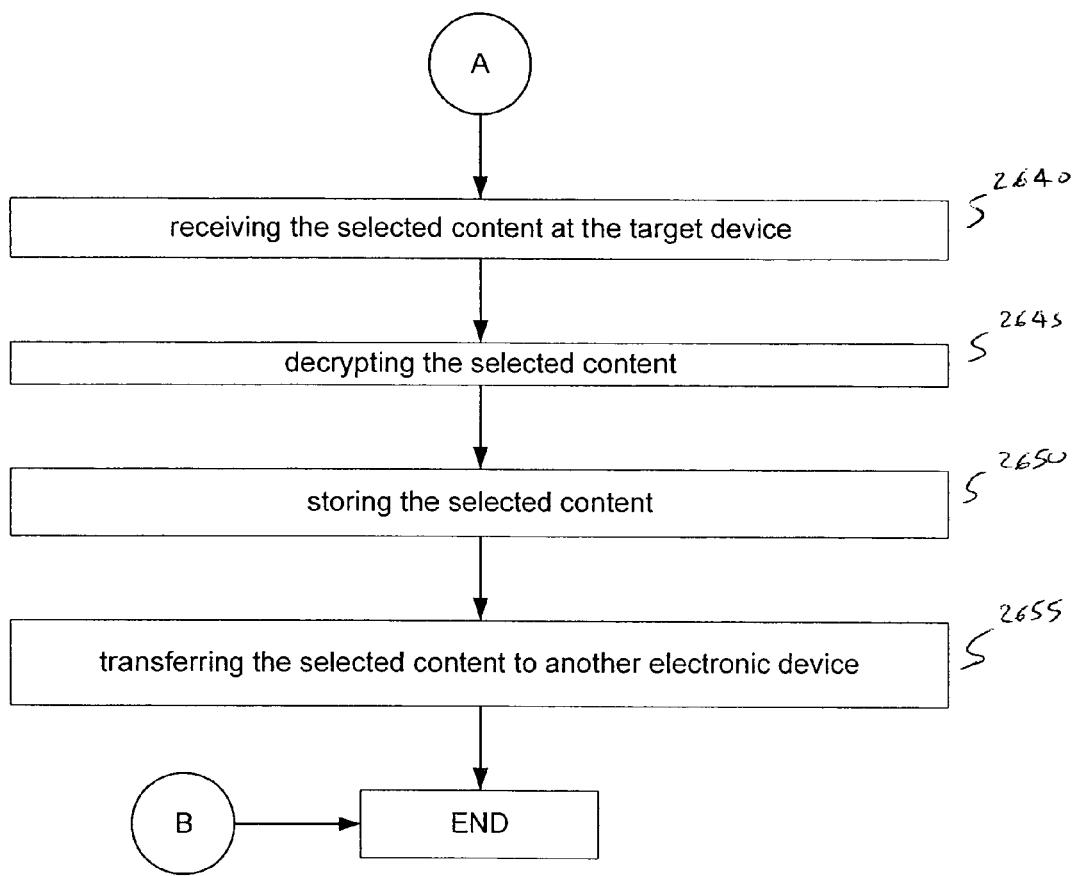
FIG. 26B shows a flow diagram for downloading content to a target device in accordance with one embodiment of the present invention.

Referring now to FIG. 26A, a flow diagram 2600 for one embodiment of the present invention for downloading content to a target device in response to initiation of the download by the user of the target device is shown. At step 2605, a selected target device (e.g., cell-phone 2474) as identified by the set-top box 2410, receives a message from the content provider indicating that a content selected by the set-top box 2410 is ready for download. Furthermore, the message may also indicate that in order to download the selected content, the download must be initiated by the target device 2474.

At step 2610, the target device 2474 generates a user interface that is operable to allow the user of the target device 2474 to interact with the target device 2474 in response to the message received from the content provider. At step 2615, using the generated interface, the received message is displayed. The displayed message also provides a plurality of selectable actions that may be selected by the user. For example, selectable actions may be to download the selected content immediately, to download the selected content at a subsequent time, to reject downloading the selected content, to always permit downloading of content initiated by a particular set-top box 2410, to never permit downloading content initiated by a particular set-top box 2410, or alternatively to download content initiated by a particular set-top box 2410 in response to explicit authorization by the target device 2474 to name a few.

At step 2620, in response to a user selection, the target device 2474 processes and performs the selected action. For example, at step 2625, the target device 2474 may process the selected action to determine if download is initiated. At step 2625 if the download is initiated, the process continues to step 2640. Alternatively, at step 2630, if the download is not initiated the target device processes and determines whether a download is to be initiated at a subsequent time. The download at a subsequent time may be predetermined or specified by the user of the target device 2474. At step 2630, if the download is not initiated at a subsequent time, the process ends. Alternatively, if the download is initiated at a subsequent time, at step 2635 the target device 2474 keeps checking the status to determine whether the time has arrived to initiate the download. When the target device 2474 determines that it is time to initiate the download, the process continues to step 2640.

At step 2640, the target device 2474 receives the selected content from the content provider, as initiated by the set-top box 2410. Downloading the selected content may be aborted by the user of the target device 2474 at any time. At step 2645, the target device 2474 determines whether the received content is encrypted and if so, then the content is decrypted. At step 2650, the target device stores the received content. The content may be stored on a removable memory (e.g., flash memory). After the content is successfully downloaded to the target device 2474, at step 2655 the content may be transferred to other electronic devices depending on the type of licensing provided by the content provider (e.g., DRM license acquisition 2450). Optionally, at step 2655, the content may be encrypted prior to transfer of content as dictated by the license provider.

Figure 27:
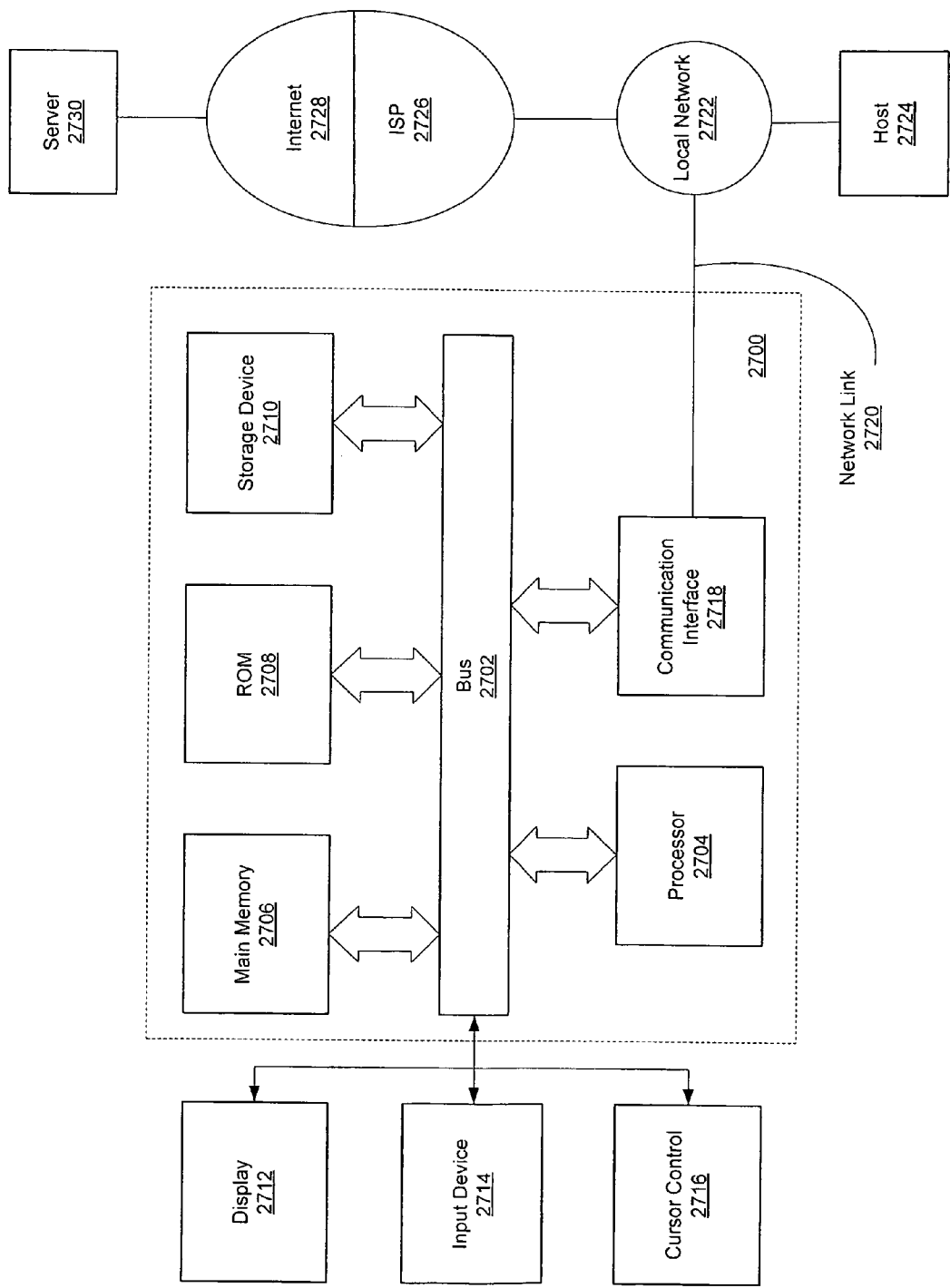
FIG. 27 illustrates a general purpose computer system that may serve as a platform for embodiments of the present invention.

FIG. 27 is a block diagram that illustrates a computer system 2700 upon which an embodiment of the present invention for downloading and uploading content to a target device, or downloading content to a content downloader may be implemented. Computer system 2700 for downloading/uploading content to a target device/content downloader as shown in FIGS. 1-26 includes a bus 2702 or other communication mechanism for communicating information, and a processor 2704 coupled with bus 2702 for processing information. Computer system 2700 also includes a main memory 2706, such as a random access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704. Computer system 2700 further includes a read only memory (ROM) 2708 or other static storage device coupled to bus 2702 for storing static information and instructions for processor 2704. A non-volatile storage device 2710, such as a magnetic disk or optical disk, is provided and coupled to bus 2702 for storing information and instructions and may store the persistent internal queue.

Computer system 2700 may be coupled via bus 2702 to an optional display 2712, such as a cathode ray tube (CRT), for displaying information to a computer user. An optional input device 2714, including alphanumeric and other keys, may be coupled to bus 2702 for communicating information and command selections to processor 2704. Another type of user input device is cursor control 2716, such as a mouse, a trackball, or cursor direction keys for communicating direction information and command selections to processor 2704 and for controlling cursor movement on display 2712.

An embodiment of the invention is related to the use of computer system 2700 for downloading and uploading content to a target device. According to one embodiment of the invention, the interface is used in response to processor 2704 executing one or more sequences of one or more instructions contained in main memory 2706 e.g., to implement process 1500, 2500 and 2600. Such instructions may be read into main memory 2706 from another computer readable medium, such as storage device 2710. Execution of the sequences of instructions contained in main memory 2706 causes processor 2704 to perform the process steps described herein. One or more processors in a multi-processing arrangement may also be employed to execute the sequences of instructions contained in main memory 2706. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2704 for execution. Such a medium may take many forms, including but not limited to, non-volatile media, volatile media, and transmission media. Non-volatile media includes, for example, optical or magnetic disks, such as storage device 2710. Volatile media includes dynamic memory, such as main memory 2706. Transmission media includes coaxial cables, copper wire and fiber optics, including the wires that comprise bus 2702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2704 for execution. For example, the instructions may initially be carried on a magnetic disk of a remote computer. The remote computer can load the instructions into its dynamic memory and send the instructions over a telephone line using a modem. A modem local to computer system 2700 can receive the data on the telephone line and use an infrared transmitter to convert the data to an infrared signal. An infrared detector coupled to bus 2702 can receive the data carried in the infrared signal and place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network (ISDN) card or a modem to provide a data communication connection to a corresponding type of telephone line. As another example, communication interface 2718 may be a local area network (LAN) card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) 2726. ISP 2726 in turn provides data communication services through the worldwide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and form computer system 2700, are example forms of carrier waves transporting the information.

Computer system 2700 can send and receive messages through the network(s), network link 2720 and communication interface 2718. In the Internet example, a server 2730 might transmit a requested code for an application program through Internet 2728, ISP 2726, local network 2722 and communication interface 2718. The received code may be executed by processor 2704 as it is received, and/or stored in device 2710, or other non-volatile storage for later execution.

In the foregoing specification, embodiments of the invention have been described with reference to numerous specific details that may vary from implementation to implementation. Thus, the sole exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A content downloader system comprising:
    a set-top-box comprising a user interface, wherein said user interface enables content selection and download responsive to user initiation using the user interface of the set-top-box;
    a display operable to display said user interface; and
    a content downloader coupled to, and separate from, said set-top-box and separate from the display, wherein said content downloader is operable to receive a user selected content, the user selected content being selected by the user initiation using the user interface of the set-top-box, the user selected content being received by the content downloader from a content provider prior to said set-top-box receiving said user selected content, and wherein said content downloader is operable to download and play a movie based on said user selected content.

2. The content downloader system as described in claim 1 wherein said content downloader is further coupled to said content provider and wherein said content provider in response to said user initiation, uploads said user selected content to said content downloader.

3. The content downloader system as described in claim 1 wherein said user interface is a graphical user interface.

4. The content downloader system as described in claim 1 wherein said content downloader comprises:
    a status indicator;
    at least one memory component; and
    an input/output connection operable to communicate with said content provider and coupled to said set-top-box.

5. The content downloader system as described in claim 4 wherein said status indicator indicates whether a download is in progress, whether said content downloader has sufficient memory, whether said download is complete and whether said content downloader is connected.

6. The content downloader system as described in claim 4 wherein said memory component comprises at least one removable memory card.

7. The content downloader system as described in claim 4 wherein said content downloader further comprises:
    a wireless device for sending and receiving content.

8. The content downloader system as described in claim 4 wherein said content downloader further comprises:
    additional connections capable of communicatively coupling said content downloader to electronic devices separate from said set-top-box, and wherein said electronic devices bypass said set-top-box.

9. The content downloader system as described in claim 4 wherein said content downloader further comprises:
    an encryption/decryption unit to decrypt encrypted content downloaded and to encrypt downloaded content before transferring said downloaded content to other electronic devices.

10. The content downloader system as described in claim 1 wherein said content downloader has an identification that is registered with a content provider and wherein an identity of said content downloader is authenticated by said content provider before said content provider begins uploading said user selected content to said content downloader.

11. The content downloader system as described in claim 1 further comprising a cable modem and wherein said content downloader is integrated within said cable modem.

12. The content downloader system as described in claim 1 further comprising a wireless router wherein said content downloader is integrated within said wireless router.

13. The content downloader system as described in claim 1 further comprising a cable modem and wherein said content downloader is further coupled to said cable modem.

14. A method for downloading content in an electronic system, said method comprising:
generating a user interface using a set-top-box device, wherein said user interface is operable to allow a user to select a first content from a plurality of selectable content items, wherein said plurality of selectable content items is operable to comprise a movie;
displaying a portion of said user interface wherein said user interface comprises said plurality of selectable content items;
in response to a user selection of said first content using the set-top-box device, initiating a download operation wherein said selected content is delivered from a content provider to a device prior to delivery of said first content to said set-top-box; and
storing said first content into said device for playing of the first content by the device, wherein said device is separate from said set-top-box.

15. The method as described in claim 14 wherein said user interface is a graphical user interface.

16. The method as described in claim 14 wherein said initiating said download further comprises:
sending an identification of said device; and
said device receiving said first content from said content provider if said device is successfully authenticated.

17. The method as described in claim 16 wherein said authentication is performed by comparing said identification of said device to previously registered devices stored in said content provider.

18. The method as described in claim 14 wherein said initiating said download further comprises:
determining whether said device comprises sufficient memory to store said first content; and
indicating a status of said device by outputting a signal.

19. The method as described in claim 18 wherein said output signal is selected from a group consisting of lighting a light emitting device (LED), displaying a message to a user, and outputting an audio output.

20. The method as described in claim 14 wherein said initiating said download further comprises:
creating at least one folder in said device for storing said first content to a memory.

21. The method as described in claim 14 wherein said first content is encrypted before uploading from said content provider and decrypted after downloading said first content to said device.

22. The method as described in claim 14 wherein said first content is encrypted after said first content is downloaded by said device and before said content is sent to another electronic device.

23. A device for downloading a selectable content, said device comprising:
an input/output connection, wherein said input/output connection is communicatively coupled to a content provider and a set-top-box that is separate from the device, wherein said device in response to a user command, initiated by input into a user interface of said set-top-box, receives said selectable content from said content provider, wherein said device is operable to download a movie based on said selectable content for play thereof by the device; and at least one memory component in which said selectable content is content is stored.

24. The device as described in claim 23 further comprising: a status indicator wherein said status indicator indicates whether a download is in progress, whether said device has sufficient memory, whether said download is complete and whether said device is connected.

25. The device as described in claim 23 wherein said memory component comprises at least one removable memory card.

26. The device as described in claim 23 further comprising: a wireless device for sending and receiving said selectable content.

27. The device as described in claim 23 further comprising: additional connections capable of communicatively coupling said device to other electronic devices.

28. The device as described in claim 23 further comprising: an encryption/decryption unit to decrypt encrypted content downloaded and to encrypt said content before transferring said content to other electronic devices.

29. The device as described in claim 23 further comprising an identification wherein said identification is registered with said content provider such that the identity of said content downloader is authenticated by said content provider before said content provider begins uploading said content to said device.

30. The content downloader system as described in claim 1, wherein an amount of memory required by said content downloader to store said user selected content is rendered by said display.

* * * * *